(12) United States Patent
Ishii

(10) Patent No.: US 8,634,458 B2
(45) Date of Patent: Jan. 21, 2014

(54) IMAGE PROCESSING APPARATUS
(75) Inventor: Yoshiki Ishii, Yokohama (JP)
(73) Assignee: Canon Kabushiki Kaisha, Tokyo (JP)
( * ) Notice: Subject to any disclaimer, the term of this patent is extended or adjusted under 35 U.S.C. 154(b) by 1535 days.
(21) Appl. No.: 11/816,497
(22) PCT Filed: Feb. 16, 2006
(86) PCT No.: PCT/JP2006/303207
§ 371 (c)(1),
(2), (4) Date: Aug. 16, 2007
(87) PCT Pub. No.: WO2006/090755
PCT Pub. Date: Aug. 31, 2006

(65) Prior Publication Data
US 2009/0225193 A1 Sep. 10, 2009

(30) Foreign Application Priority Data

Feb. 23, 2005 (JP) ................................. 2005-047442
Feb. 23, 2005 (JP) ................................. 2005-047443
Feb. 23, 2005 (JP) ................................. 2005-047444
Oct. 7, 2005 (JP) ................................. 2005-294998

(51) Int. Cl.
H04N 7/12 (2006.01)
H04N 11/02 (2006.01)
H04N 11/04 (2006.01)
(52) U.S. Cl.
USPC ............ 375/240.03; 375/240.05; 375/240.26; 348/231.99
(58) Field of Classification Search
USPC .......................... 375/240.03, 240.05, 240.26; 348/231.99
See application file for complete search history.

(56) References Cited

U.S. PATENT DOCUMENTS 5,291,282 A * 3/1994 Nakagawa et al. ...... 375/240.23
5,617,138 A * 4/1997 Ito et al. ..................... 348/222.1
5,647,049 A * 7/1997 Odaka et al. .................. 386/247
5,787,221 A * 7/1998 Matsumi et al. .............. 386/338
5,963,673 A * 10/1999 Kodama et al. ............... 382/239
6,009,236 A * 12/1999 Mishima et al. .............. 386/329
6,295,406 B1* 9/2001 Matsumi et al. .............. 386/306
6,577,812 B1* 6/2003 Kikuchi et al. ............... 386/248
6,650,787 B1 11/2003 Takahashi et al.
2004/0022316 A1* 2/2004 Ueda et al. ............... 375/240.05
2004/0246349 A1* 12/2004 Kim et al. ................ 348/231.99
2006/0044420 A1* 3/2006 Iguchi et al. ............. 348/231.99
2008/0151076 A1* 6/2008 Takane ..................... 348/231.99

FOREIGN PATENT DOCUMENTS

| JP | 04-079587 | 3/1992 |
|---|---|---|
| JP | 11-103446 | 4/1999 |
| JP | 2000-197048 | 7/2000 |
| JP | 2000-324449 A | 11/2000 |
| JP | 2001-086510 | 3/2001 |
| JP | 2001-169284 A | 6/2001 |
| JP | 2001-313906 A | 11/2001 |
| JP | 2002-314922 A | 10/2002 |
| JP | 2002-369142 | 12/2002 |
| JP | 2003-023637 | 1/2003 |
| JP | 2003-134368 | 5/2003 |
| JP | 2004-128953 A | 4/2004 |

* cited by examiner

Primary Examiner — Chikaodili E Anyikire
(74) Attorney, Agent, or Firm — Cowan, Liebowitz & Latman, P.C.

(57) ABSTRACT

This invention provides an apparatus capable of optimal code amount control corresponding to an input source. The apparatus includes a first input unit which inputs the first moving image data, a second input unit which inputs the second moving image data, a selection unit which selects one of the first and second moving image data, a coding unit which encodes the first or second moving image data selected by the selection unit, a recording unit which records encoded moving image data output from the coding unit on a recording medium, a code amount control unit which controls the generated code amount of the encoded moving image data output from the coding unit, and a change unit which changes the control procedure of the code amount control unit in accordance with the selection result of the selection unit.

12 Claims, 29 Drawing Sheets

F I G. 26
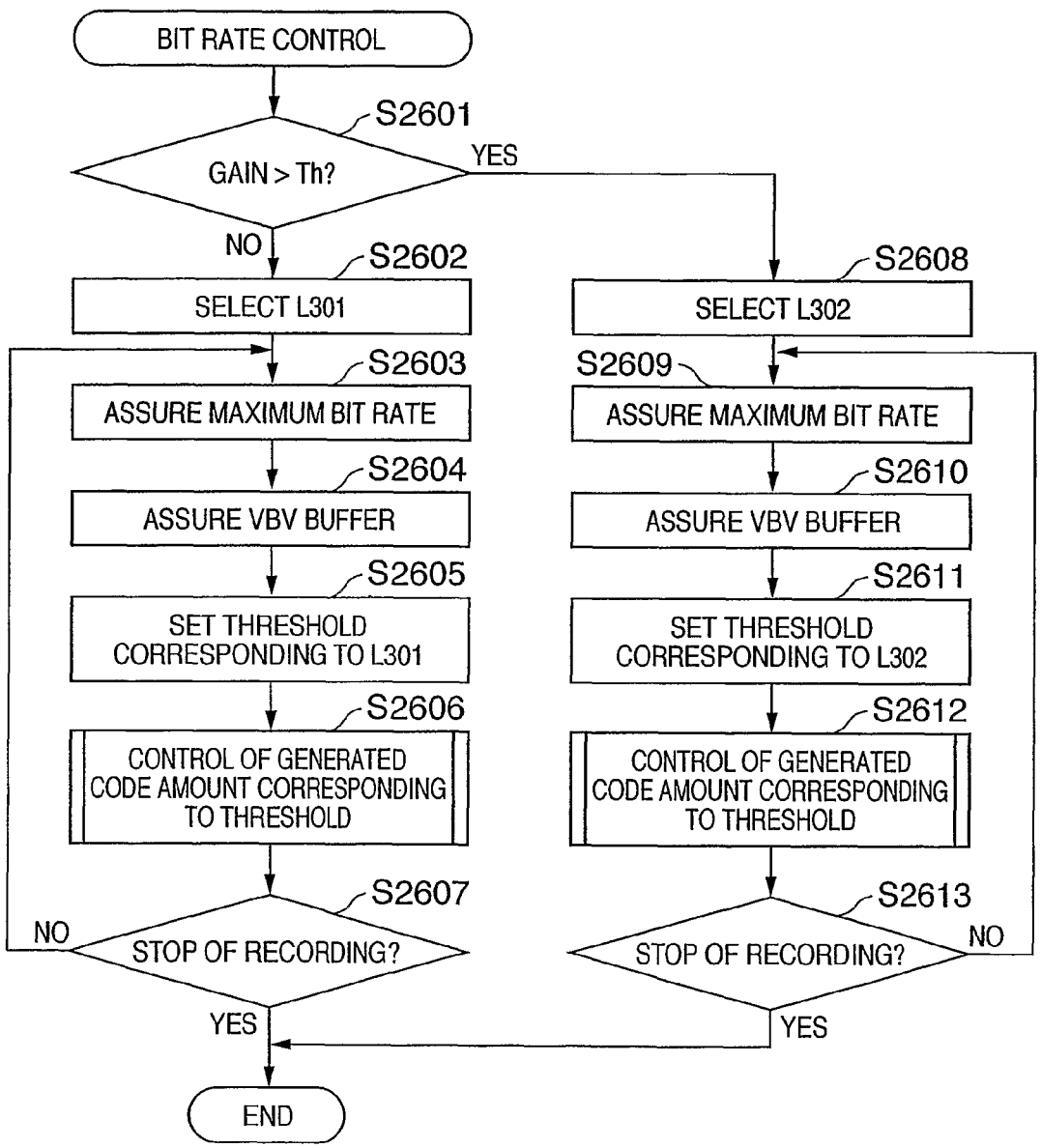

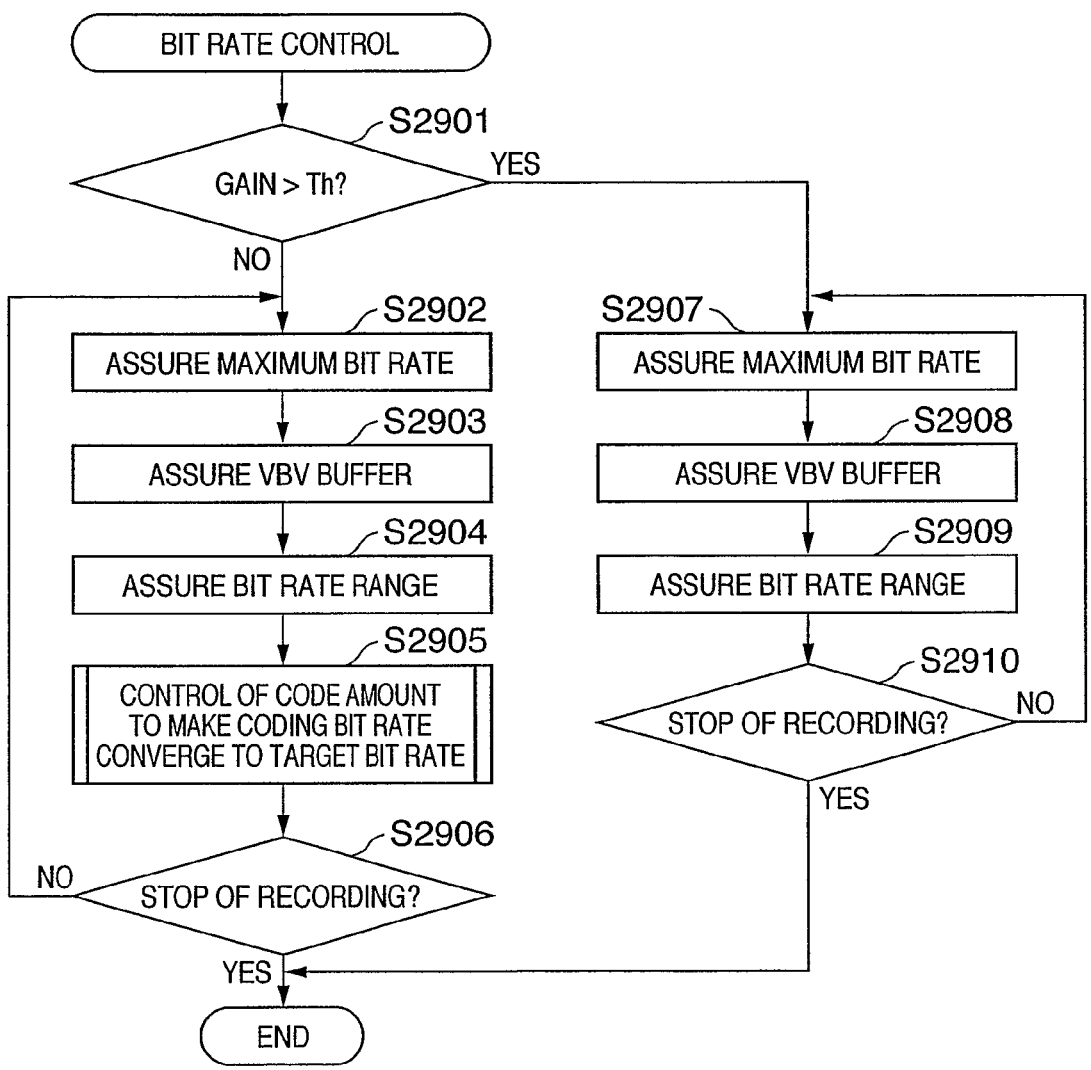
F I G. 29

IMAGE PROCESSING APPARATUS

TECHNICAL FIELD

The present invention relates to an image processing apparatus and, more particularly, to control of the coding bit rate of a moving image photographed by a camera and that of an externally input moving image when a moving image is compressed and recorded using variable-length coding of coding processing for moving image data.

BACKGROUND ART

Recently, disk recorders have replaced VTRs to record television broadcasts. The disk recorder records a moving image signal on a disk medium such as a hard disk or DVD, and plays back the signal. The disk recorder can record digital moving image data on one disk medium by encoding the data by variable-length coding such as MPEG-2 and compressing an enormous amount of information.

In compression based on variable-length coding, the data rate (bit rate) of encoded data changes any time in accordance with the complexity and motion of an input image. Generally, in order to prevent buffer overflow and underflow, and meet the limitation of the recording capacity, the coding bit rate is controlled to adjust the encoded data amount close to a predetermined value by feedback control (see, e.g., Japanese Patent Laid-Open No. 2000-197048 (corresponding to U.S. Pat. No. 6,650,787)).

By the difference in coding bit rate control method, variable-length coding processes are classified into two coding methods: CBR (Constant Bit Rate) coding which keeps the generated code amount almost constant, and VBR (Variable Bit Rate) coding which performs optimal code amount distribution in accordance with the complexity and the degree of motion of an image in each frame of a moving image even while adjusting the average value of the coding bit rate to a target value.

In VBR coding, the generated code amount of all moving image data to be coded is estimated, and then actual coding is performed. With this 2-pass arrangement, ideal code amount distribution can be achieved. Conventionally, moving image data to be encoded is temporarily accumulated, and undergoes VBR coding by offline processing by software.

With recent development of hardware which performs VBR coding in real time, the above-mentioned disk recorder generally executes real-time VBR coding, which is advantageous to the image quality. This real-time bit rate control technique is called 1-pass encoding in contrast to 2-pass encoding of distributing a code amount in advance to moving image data to be encoded and encoding the data.

Control of the coding bit rate in VBR coding by 1-pass encoding tries to implement almost ideal code amount distribution, which is achieved by 2-pass encoding, regardless of local characteristics such as the complexity and the degree of motion of each frame of a moving image. For this purpose, coding bit rates in a predetermined period are averaged, and the code amount is gradually controlled to adjust the average value to a target coding bit rate. The gradient of control to make the average bit rate asymptotic to a target value determines the time of convergence to the target coding bit rate.

FIG. 14 is a timing chart showing an example of a change of the coding bit rate when a target bit rate is set and moving image data is encoded by VBR coding. L1401 represents a change of the coding bit rate per unit time. In L1401, the coding bit rate gradually converges to a target bit rate BR in a convergence time T.

As a method of controlling the coding bit rate to a target bit rate in a predetermined convergence time in VBR coding, a convergence curve corresponding to the target bit rate is selected on the basis of the time elapsed after the start of coding and the current average bit rate. While the influence on image quality is reduced, the coding bit rate is made to converge to the target bit rate in a predetermined convergence time (see, e.g., Japanese Patent Laid-Open No. 2000-197048).

When a television broadcast is received and recorded by a disk recorder or the like, the time of convergence to a target bit rate in VBR coding is considered to be ideally around 10 min, in order to eliminate any dependence on local characteristics of a moving image and adjust distribution to an ideal one.

At this time, the average of all bit rates after the start of recording is calculated and controlled to a target coding bit rate, assuring a total recording data amount at a predetermined precision. This control is effective when the free capacity of a medium and the recording time are defined in timed recording of a television broadcast or the like.

In recent years, video cameras using DVDs as recording media are also available. In the video camera, one scene from the start to stop of recording takes generally 1 min or less. If the code amount is controlled to adjust the coding bit rate to a target bit rate for a long time in VBR coding, as described above, recording often stops before the coding bit rate converges to the target rate. It is conceived to control the code amount in VBR coding so that the coding bit rate converges to a target bit rate in a short period of 1 min or less in the video camera or the like.

The video camera has a weak demand for assurance of the recording time, compared to a home disk recorder and the like. Some video cameras do not perform strict adjustment of the recording capacity using the total average bit rate after the start of recording.

The above-described video camera has a function of receiving not only moving image data photographed by a camera but also moving image data externally transmitted to the camera via an external input terminal, and encoding and recording the data.

A video camera which encodes and records moving image data by VBR coding performs bit rate control when moving image data externally input to the video camera is recorded, similarly to a case wherein moving image data from the camera is encoded. When a TV tuner or the like is connected to an external input terminal to record a television broadcast program by the video camera, code amount distribution for the total program is less optimal than in a home disk recorder, which is disadvantageous to the image quality and recording capacity.

The above-mentioned video camera which does not adjust the recording capacity using the total average bit rate performs the same bit rate control even when externally input moving image data is encoded. No actual recording time can be assured for display of the recordable time at the start of recording.

Recently, digital cameras using memory cards as recording media, and video cameras using DVDs as recording media are put into practical use. Further, video cameras which have both a DVD drive and memory card slot and can record moving image data on each recording medium also appear on the market.

These days, the recording capacity of memory cards is abruptly increasing, but is limited in comparison with an optical disk (e.g., DVD) and an HDD. One scene from the start to stop of recording often takes 1 min or less.

The code amount is controlled to adjust the coding bit rate to a target bit rate for a long time in VBR coding in a video camera capable of recording moving image data on both a disk medium of a relatively large recording capacity and a memory card of a small recording capacity. In this case, if moving image data is recorded on a memory card, recording often stops before the coding bit rate converges to a target rate.

When the bit rate is controlled in recording moving image data on a memory card, similar to encoding moving image data on a disk, the recording bit rate greatly varies even in recording on the memory card of a limited recording capacity. The recordable time cannot be accurately predicted, resulting in poor user friendliness.

When the above-mentioned video camera having the VBR coding mode photographs a scene, e.g., a ceremony continuously for a long time, code amount distribution is less optimal as a whole than in a home DVD recorder, which is disadvantageous to the image quality and recording capacity.

If the above-mentioned video camera which does not adjust the recording capacity using the total average bit rate records data continuously for a long time, no actual recording time can be assured for display of the recordable time at the start of recording.

The video camera is controlled to correct exposure at a combination of mainly the F-number and shutter speed within the range of normal brightness. If the shutter speed excessively decreases in a dark scene in which the F-number is set to a full-aperture value, an image blurs. In such a dark scene, the gain of the signal processing circuit must be increased.

The increase in the gain of the signal processing circuit increases noise in an image.

Compared to photographing at normal brightness, coding complexity changes, and code amount distribution in VBR coding becomes less optimal.

DISCLOSURE OF INVENTION

The present invention has been made to overcome the conventional drawbacks, and has as its object to provide an apparatus capable of optimal code amount control corresponding to an input source.

It is another object of the present invention to provide an apparatus capable of optimal code amount control corresponding to a recording medium.

It is still another object of the present invention to provide an apparatus capable of optimal code amount control corresponding to a recording purpose.

It is still another object of the present invention to provide an apparatus capable of optimal code amount control corresponding to the setting state of a signal processing circuit in photographing.

To solve the above problems, according to the first aspect of the present invention, an image processing apparatus is characterized by comprising first input means for inputting first moving image data, second input means for inputting second moving image data, selection means for selecting one of the first moving image data and the second moving image data, coding means for encoding one of the first moving image data and second moving image data which is selected by the selection means, recording means for recording encoded moving image data output from the coding means on a recording medium, code amount control means for controlling a generated code amount of the encoded moving image data output from the coding means, and change means for changing a control procedure of the code amount control means in accordance with a selection result of the selection means.

According to the second aspect of the present invention, an image processing apparatus is characterized by comprising input means for inputting moving image data, coding means for encoding the moving image data, first recording means for recording encoded moving image data output from the coding means on a first recording medium, second recording means for recording the encoded moving image data output from the coding means on a second recording medium, selection means for selecting one of the first recording medium and the second recording medium to record the encoded moving image data, code amount control means for controlling a generated code amount of the encoded moving image data output from the coding means, and change means for changing a control procedure of the code amount control means in accordance with a selection result of the selection means.

According to the third aspect of the present invention, an image processing apparatus is characterized by comprising input means for inputting moving image data, coding means for encoding the moving image data by a variable bit rate coding method of changing assignment of a code amount in accordance with a state of the moving image data to be encoded, recording means for recording encoded moving image data output from the coding means on a recording medium, code amount control means for controlling a generated code amount of the encoded moving image data output from the coding means, selection means for selecting an arbitrary coding mode from a plurality of coding modes in which the code amount control means executes code amount control operation by different control procedures, and change means for changing the control procedure of the code amount control means in accordance with a selection result of the selection means.

According to the fourth aspect of the present invention, an image processing apparatus is characterized by comprising image capturing means, image processing means for amplifying moving image data obtained by the image capturing means, gain setting means for setting an amplification gain of the image processing means, coding means for encoding the moving image data output from the image processing means, recording means for recording encoded moving image data output from the coding means on a recording medium, code amount control means for controlling a generated code amount of the encoded moving image data output from the coding means, and switching means for switching between a plurality of coding modes in which the code amount control means executes code amount control operation by different control procedures in accordance with the amplification gain set by the gain setting means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF DRAWINGS

FIG. 26 is a flowchart showing the operation of bit rate control according to the 13th embodiment of the present invention;

FIG. 29 is a flowchart showing the operation of bit rate control according to the 16th embodiment.

BEST MODE FOR CARRYING OUT THE INVENTION (First Embodiment)

Figure 1:
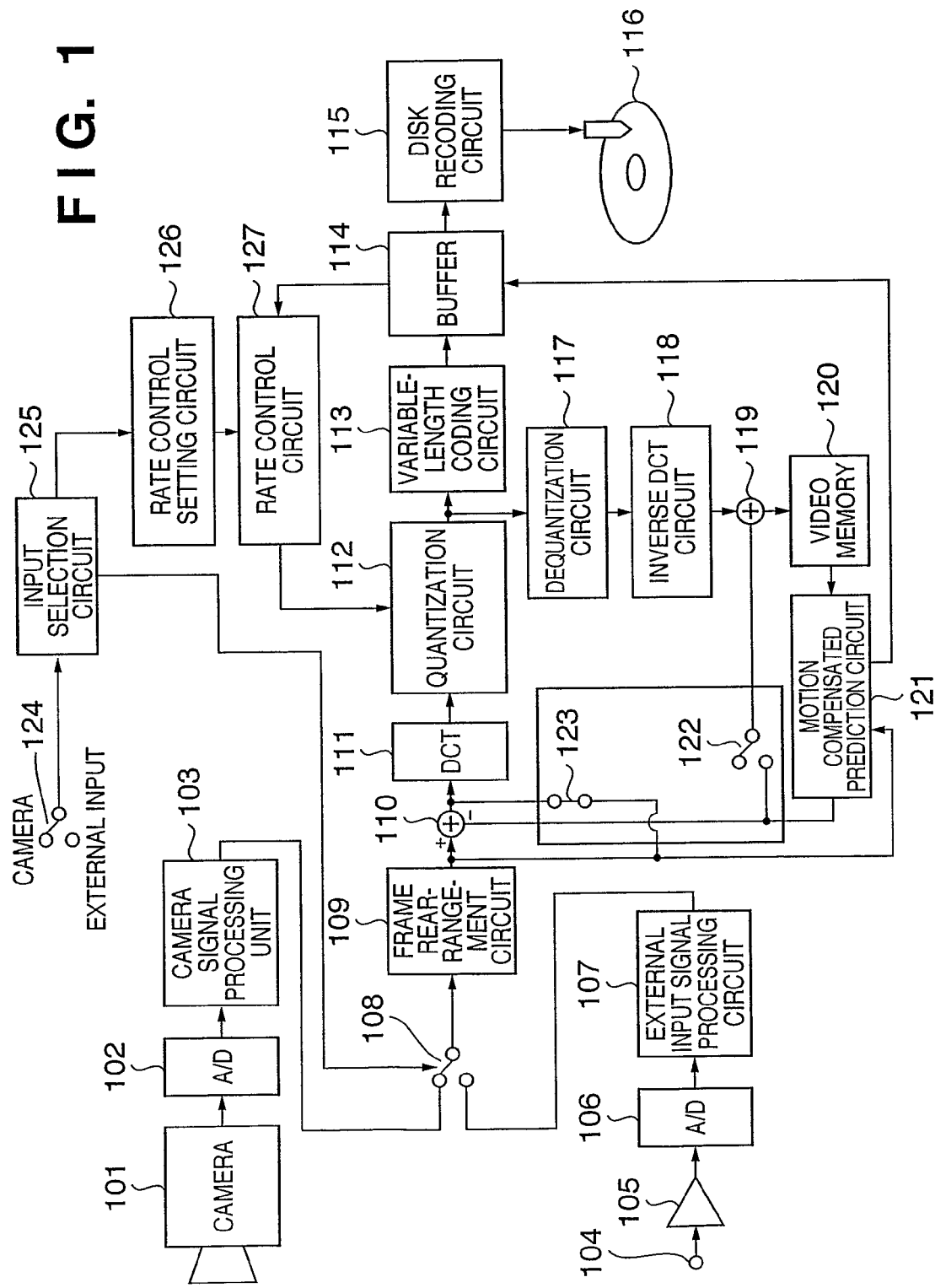
FIG. 1 is a block diagram showing the schematic configuration of a recording apparatus according to the first to fourth embodiments to which the present invention is applied.

FIG. 1 is a block diagram showing a schematic configuration according to the first embodiment of the present invention.

In FIG. 1, reference numeral 101 denotes a camera which is made up of a lens optical system and a photoelectric conversion element such as a CCD. An analog moving image signal obtained upon image capturing by the camera 101 is converted into a digital image signal by an A/D conversion circuit 102. The image signal undergoes processes such as pixel interpolation, color conversion, and Γ conversion by a camera signal processing unit 103. The processed signal is supplied to a switch 108 as data of an image format that is to be encoded.

A video signal input from an external device to an external input terminal 104 is converted into a predetermined signal level by a buffer amplifier 105, and converted into a digital image signal by an A/D conversion circuit 106. When the external input terminal is a digital signal terminal, processes by the buffer amplifier 105 and A/D conversion circuit 106 are skipped. An external input signal processing circuit 107 performs necessary processes such as color space conversion and pixel count conversion for the external video signal, converts the video signal into a format suitable for coding processing, and supplies the signal to the switch 108. The switch 108 is controlled by an input selection circuit 125 on the basis of the setting of an input selection switch 124, and selects a digital moving image signal from the camera or external input. The user can arbitrarily switch the input selection switch 124 to select and record one of a moving image from the camera 101 and a moving image from the external input terminal 104.

Selected moving image signals are rearranged in the coding order by a frame rearrangement circuit 109. For example, in MPEG-2 coding, a bidirectionally predictive frame called a B picture should be encoded after preceding and succeeding frames are encoded. Hence, rearrangement processing by the frame rearrangement circuit 109 corresponds to processing of input moving image data after their frames are rearranged in the coding order.

In encoding an I picture, a difference circuit 110 outputs image data itself from the frame rearrangement circuit 109 in accordance with selection by a switch 123. In encoding P and B pictures, the difference circuit 110 supplies, to a DCT circuit 111, the difference value between predicted image data output from a motion compensated prediction circuit 121 and image data from the rearrangement circuit 109. The DCT circuit 111 executes known DCT processing for input image data. The image data transformed into a DCT coefficient is quantized by a quantization circuit 112 at a quantization scale Q set by a rate control circuit 127. By changing the value Q, the coefficient value after quantization greatly changes to change the generated code amount.

A variable-length coding circuit 113 entropy-encodes the quantization coefficient, and outputs it as encoded data. A buffer 114 temporarily saves encoded data for coding rate control. Encoded data stored in the buffer is read out at a predetermined rate, undergoes packetization, multiplexing, recording modulation, and the like by a medium recording circuit, and then is recorded on a medium 116.

In order to obtain predicted image data, coefficient data quantized by the quantization circuit 112 is dequantized by a dequantization circuit 117, and undergoes inverse DCT transform by an inverse DCT circuit 118.

In encoding an I picture, an addition circuit 119 directly outputs data having undergone inverse DCT transform in accordance with selection by a switch 122. In encoding a P or B picture, the addition circuit 119 adds transformed data and predicted image data output from the motion compensated prediction circuit 121, and saves the resultant data as a locally decoded image in a video memory 120.

The motion compensated prediction circuit 121 compares the locally decoded image accumulated in the video memory 120 with an input image, and generates predicted image data having undergone motion compensation. The motion compensated prediction circuit 121 supplies the predicted image data to the difference circuit 110, and also supplies the data as a predicted image for the next local decoding to the addition circuit 119.

A rate control setting circuit 126, which is a feature of the first embodiment, changes the coding rate control parameter of the rate control circuit 127 on the basis of the selection result by the input selection circuit 125. Details of a change of the control parameter will be described later.

The rate control circuit 127 controls the value of the quantization scale Q for the quantization circuit 112, and adjusts the generated code amount close to a target bit rate by using information such as the generated code amount and buffer occupancy obtained from the buffer 114. In the first embodiment, the rate control setting circuit 126 sets a parameter for controlling the code amount in accordance with the type of moving image signal selected by the selection switch 124.

Figure 2:
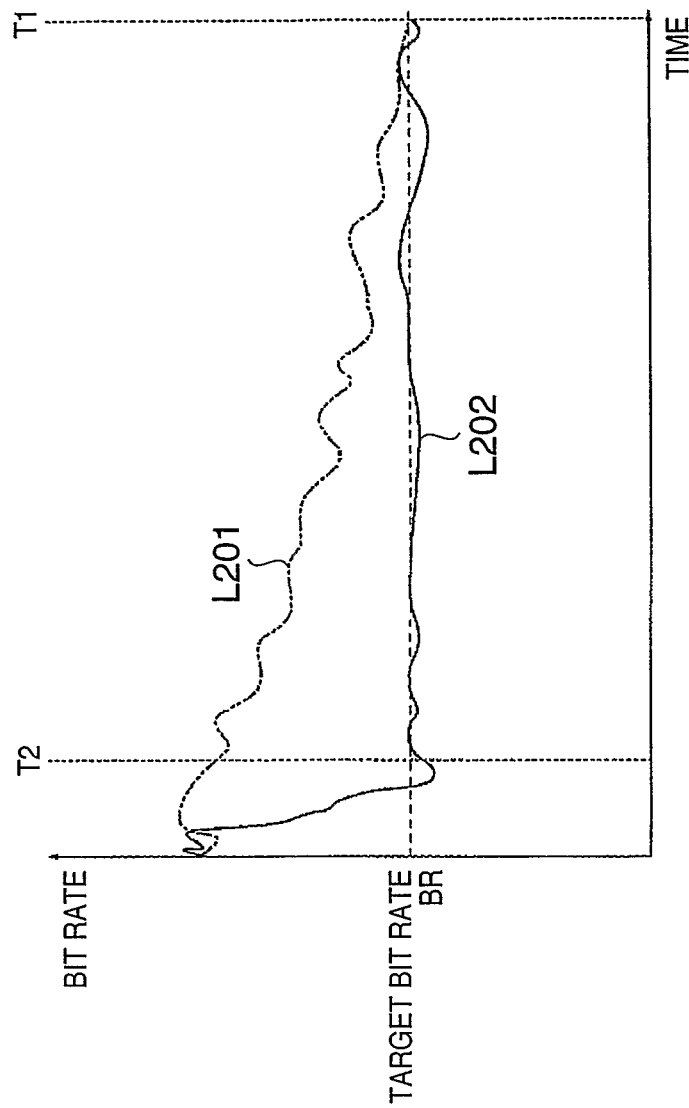
FIG. 2 is a timing chart showing an example of bit rate control according to the embodiment of the present invention.

FIG. 2 is a timing chart showing the coding bit rate of moving image data generated upon switching of coding bit rate control according to the first embodiment.

In the first embodiment, the convergence time until the coding bit rate converges to a target bit rate is switched between a case wherein a moving image signal from the camera 101 is selected and a case wherein a moving image signal from the external input terminal is selected. L201 represents a change of the coding bit rate per unit time when a moving image signal from the external input terminal 104 is selected. In L201, the coding bit rate converges to a target bit rate BR in a convergence time T1. L202 represents a change of the coding bit rate per unit time when a moving image signal from the camera 101 is selected. In L202, the coding bit rate converges to the target bit rate in a convergence time T2 much shorter than T1.

Figure 3:
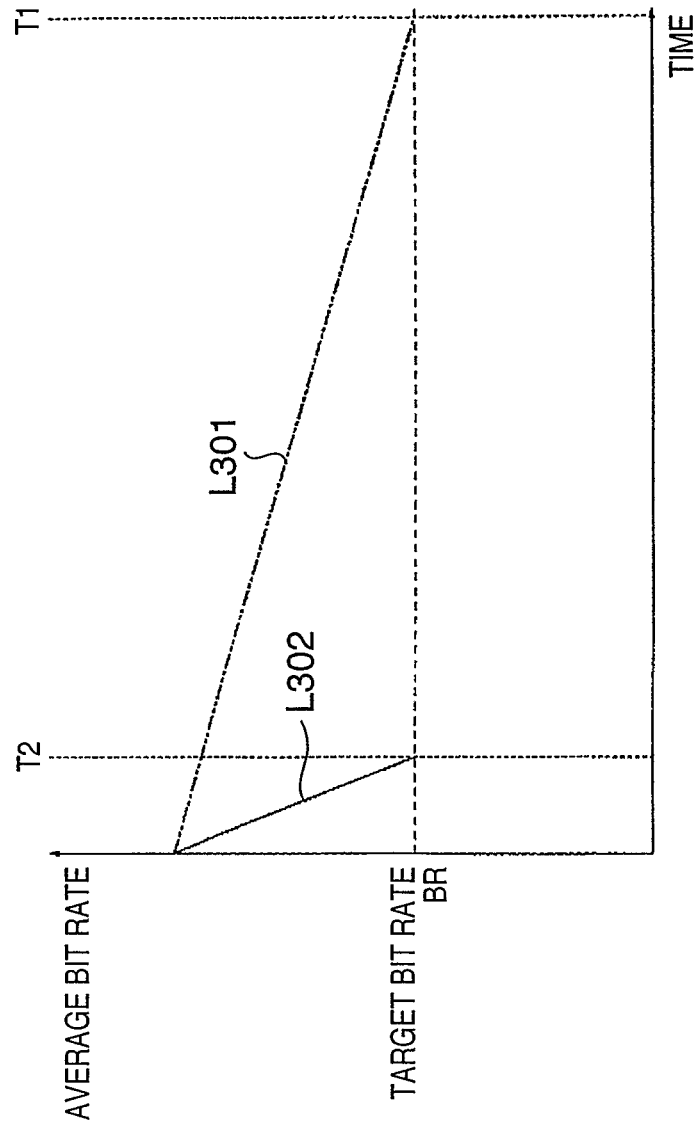
FIG. 3 is a timing chart showing an example of bit rate control according to the embodiment of the present invention.

FIG. 3 is a timing chart showing the threshold of the average bit rate set by the rate control circuit 127 in order to perform the above-described control. L301 represents the threshold of the average bit rate in a predetermined period when the convergence time is T1. If the current average bit rate is higher than L301 with respect to the elapsed time, the generated code amount is too large for the target bit rate. Thus, the quantization scale is controlled large to make the average bit rate converge to the target bit rate.

L302 represents the threshold of the average bit rate in a predetermined period when the convergence time is T2. The same control as that for L301 is executed to make the average bit rate converge to the target bit rate in the convergence time T2. In the first embodiment, the rate control setting circuit 126 sets the target bit rate control operation in the rate control circuit 127 in accordance with the selection result of the input selection circuit 125 from a moving image signal from the camera 101 and an externally input moving image signal.

The rate control setting circuit 126 sets the rate control circuit 127 so as to select L302 in FIG. 3 when a moving image signal from the camera is selected, and L301 when an external moving image signal is selected. The convergence time until the coding bit rate reaches a target bit rate can be controlled in accordance with an input signal.

Figure 4:
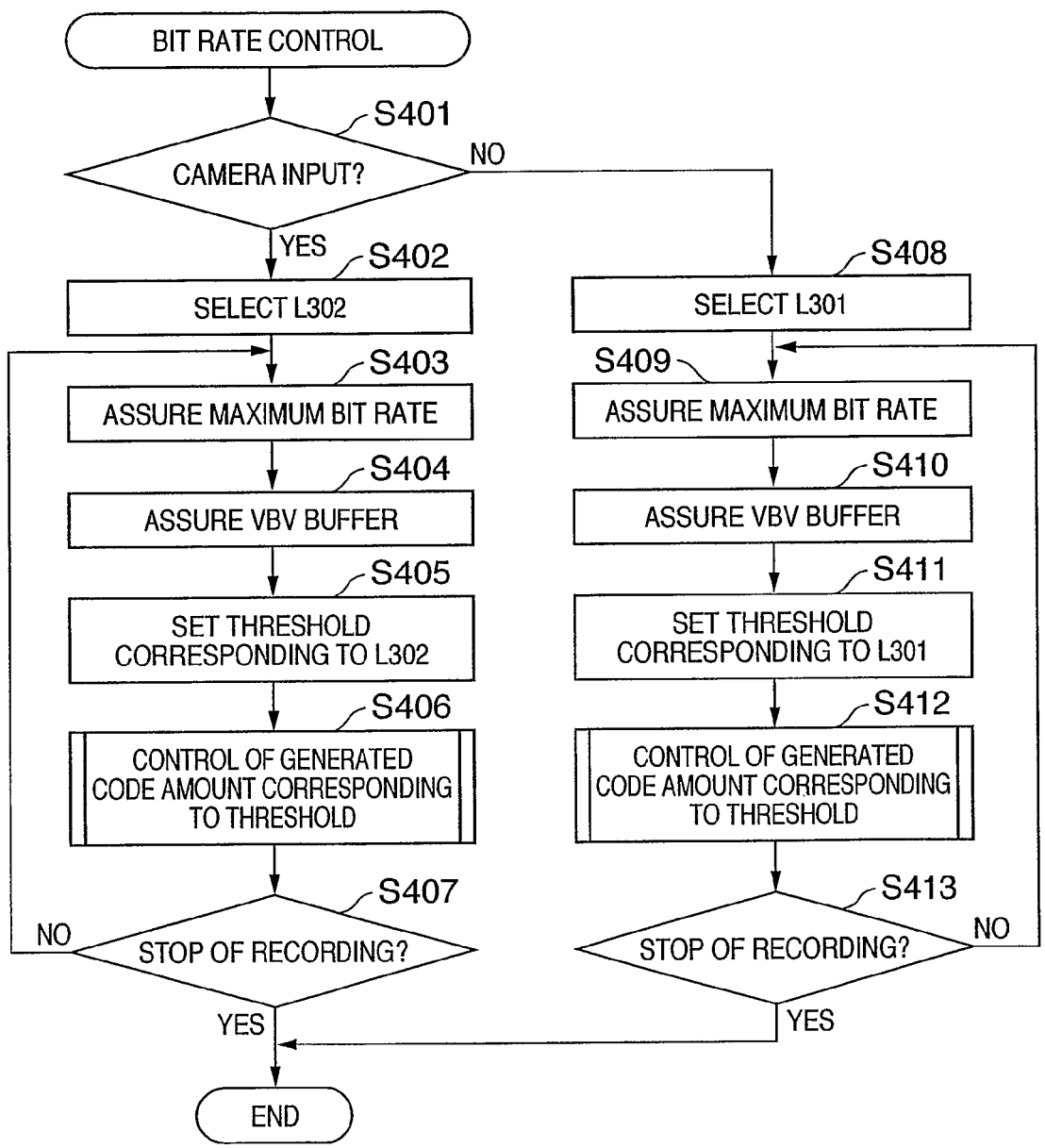
FIG. 4 is a flowchart showing the operation of bit rate control according to the first embodiment of the present invention.

FIG. 4 is a flowchart showing bit rate control processing according to the first embodiment.

When the start of recording is designated with a switch (not shown), the flow starts to determine whether a moving image from the camera 101 is selected by the selection switch 124 (S401). If a moving image from the camera 101 is selected, the rate control setting circuit 126 controls the rate control circuit 127 so as to select L302 in FIG. 3 as the threshold of the average bit rate (S402).

Then, maximum bit rate assurance processing (S403) and VBV buffer assurance processing (S404) are performed. In maximum bit rate assurance processing, in addition to the target bit rate, the current quantization scale is controlled not to exceed the upper limit of recording such as the maximum transfer rate. In VBV buffer assurance processing, the current quantization scale is controlled to prevent overflow and underflow of a virtual buffer called VBV in MPEG-2. Note that no overflow occurs in principle in variable bit rate coding. The coding control processes in S403 and S404 are general ones, examples of them are described in Japanese Patent Laid-Open No. 2000-197048, and a detailed description thereof will be omitted.

The threshold of the average bit rate is set on the basis of L302 and the time elapsed after the start of recording (S405). The set threshold of the average bit rate and a calculated average bit rate are compared to control the generated code amount (S406). Bit rate control processing from S403 to S406 is repeated every predetermined period until the stop of recording is designated. As a result, the coding bit rate of moving image data converges to the target bit rate (S407).

In L302, the change degree of the threshold of the target bit rate to the elapsed time is larger than that in L301. In code amount control, the generated code amount is controlled while the value of the quantization scale is greatly changed.

If not a moving image from the camera 101 but an externally input moving image is selected in S401, the rate control setting circuit 126 controls the rate control circuit 127 so as to select L301 in FIG. 3 as the threshold of the average bit rate (S408).

Then, maximum bit rate assurance processing (S409) and VBV buffer assurance processing (S410) are performed. The threshold of the average bit rate is set on the basis of L301 and the time elapsed after the start of recording (S411). The set threshold of the average bit rate and the current average bit rate are compared to control the generated code amount (S412). Bit rate control processing from S409 to S412 is repeated every predetermined period until the stop of recording is designated. Accordingly, the coding bit rate of moving image data converges to the target bit rate (S413).

According to the first embodiment, when a moving image from the camera is to be recorded, the coding bit rate converges to a target bit rate in a short time. Even if photographing of a relatively short time is repeated, no recording time greatly varies. When an externally input moving image is to be recorded, the coding bit rate converges to the target bit rate in a long period. Optimal code amount distribution can be expected, and both the recording time and image quality can be satisfied.

(Second Embodiment)

The second embodiment will be explained.

Figure 5:
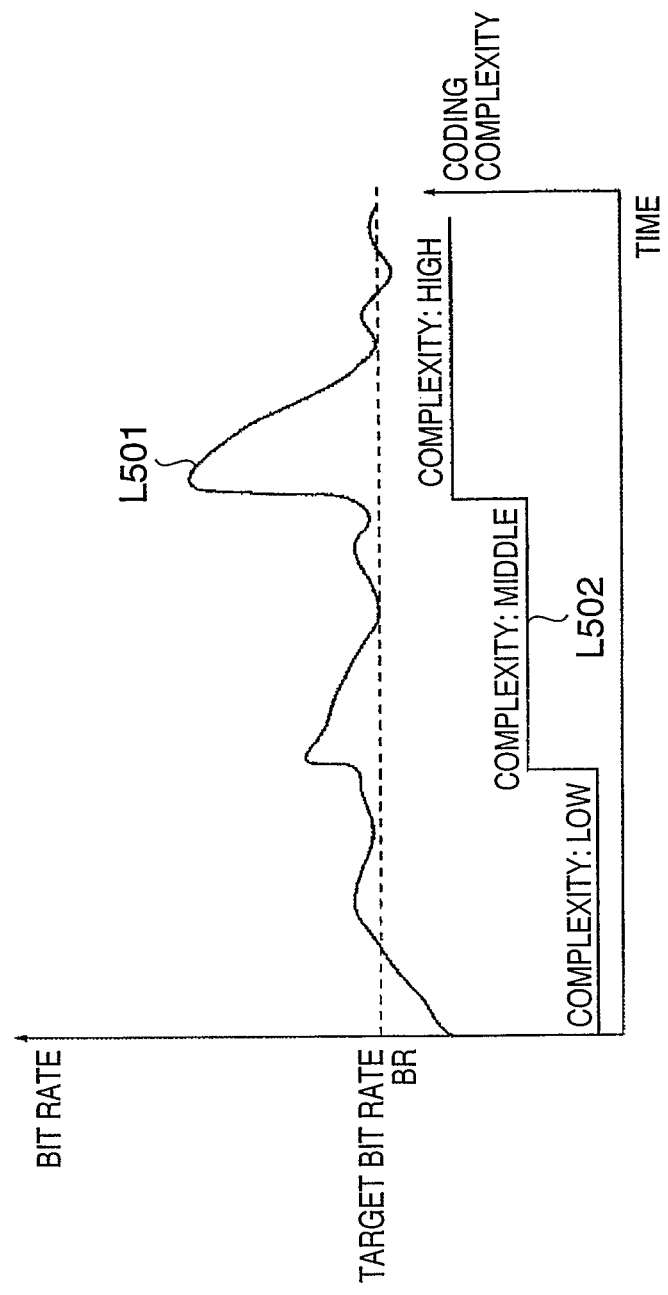
FIG. 5 is a timing chart showing an example of bit rate control according to the second embodiment.
Figure 6:
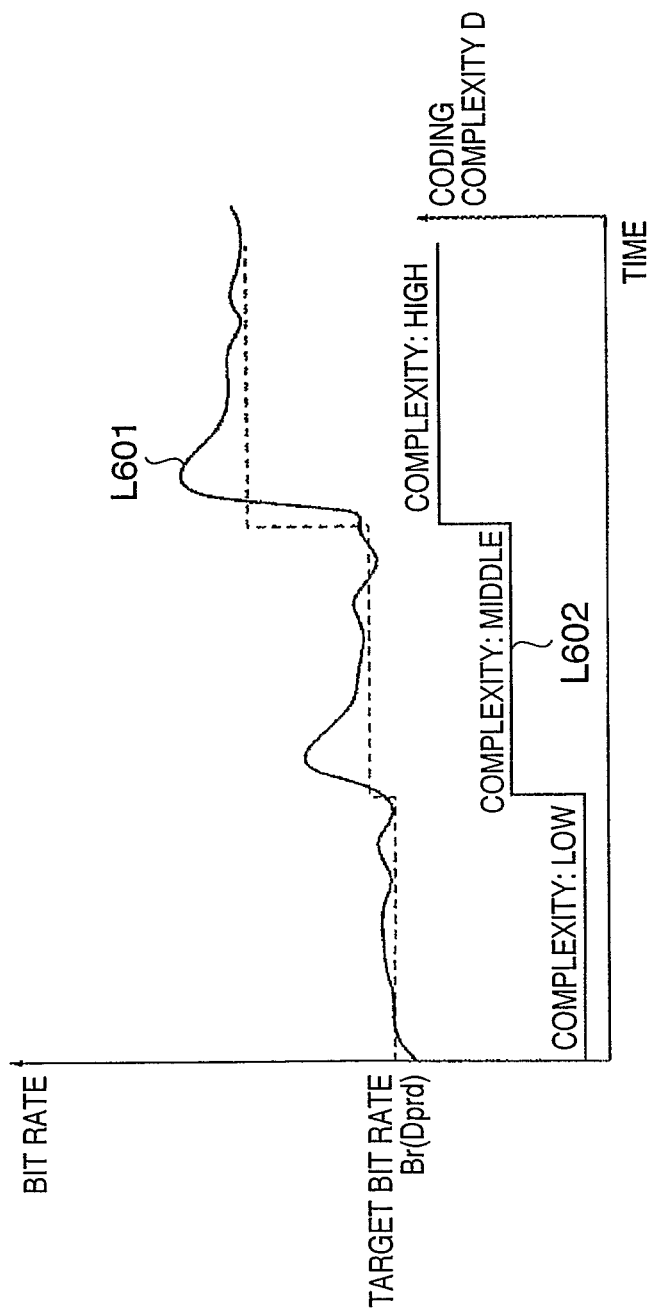
FIG. 6 is a timing chart showing an example of bit rate control according to the second embodiment.

FIGS. 5 and 6 are timing charts showing the bit rate of encoded data generated as a result of coding bit rate control according to the second embodiment.

In the second embodiment, whether to control the code amount using coding complexity is switched between a case wherein a moving image from the camera is recorded and a case wherein an externally input moving image is recorded. More specifically, when externally input moving image data is to be recorded, the code amount is controlled so that the data rate of encoded moving image data converges to a target data rate regardless of the image state (coding complexity), which will be described later. To the contrary, when moving image data input from the camera is to be recorded and an image less changes at low coding complexity, the code amount is controlled so that the data rate converges to a target data rate. If the coding complexity becomes high, the set value of the target data rate is changed high to forcibly avoid convergence to a predetermined target data rate. Also in the second embodiment, the configuration of a recording apparatus is the same as that in FIG. 1, and a detailed description thereof will be omitted.

FIG. 5 is a timing chart showing a change of the coding bit rate per unit time when the target bit rate is set to a constant value BR regardless of the coding complexity of a moving image to be encoded. L501 represents a change of the coding bit rate per unit time, and L502 represents the coding complexity. If the coding complexity changes, the generated code amount temporarily changes, but the coding bit rate converges to the target bit rate BR upon the lapse of a predetermined convergence time.

In this case, the data rate of encoded moving image data can be set constant.

FIG. 6 is a timing chart showing a change of the coding bit rate per unit time when the coding complexity of a moving image to be encoded is high and the target bit rate is changed to BR (DPRD). DPRD is a predicted value for coding complexity D, and is estimated using the past generated code amount, image feature amount, and the like. L601 represents a change of the coding bit rate per unit time, and L602 represents the coding complexity.

If the coding complexity is equal to or lower than a predetermined level, the target bit rate is set to a constant value, similar to FIG. 5. If the coding complexity changes high, the target bit rate BR (DPRD) is changed in accordance with the changed coding complexity. Although the generated code amount (compression ratio) changes, the target bit rate can be so controlled as to reduce the difference in degradation of the image quality depending on the coding complexity.

In the second embodiment, when a moving image input from the camera is to be recorded, the code amount is controlled while the target bit rate is changed in accordance with the coding complexity, as shown in FIG. 6. When an externally input moving image is to be recorded, the code amount is controlled at a constant target bit rate, as shown in FIG. 5. A rate control setting circuit 126 switches and sets these two target bit rate control characteristics for a rate control circuit 127.

Figure 7:
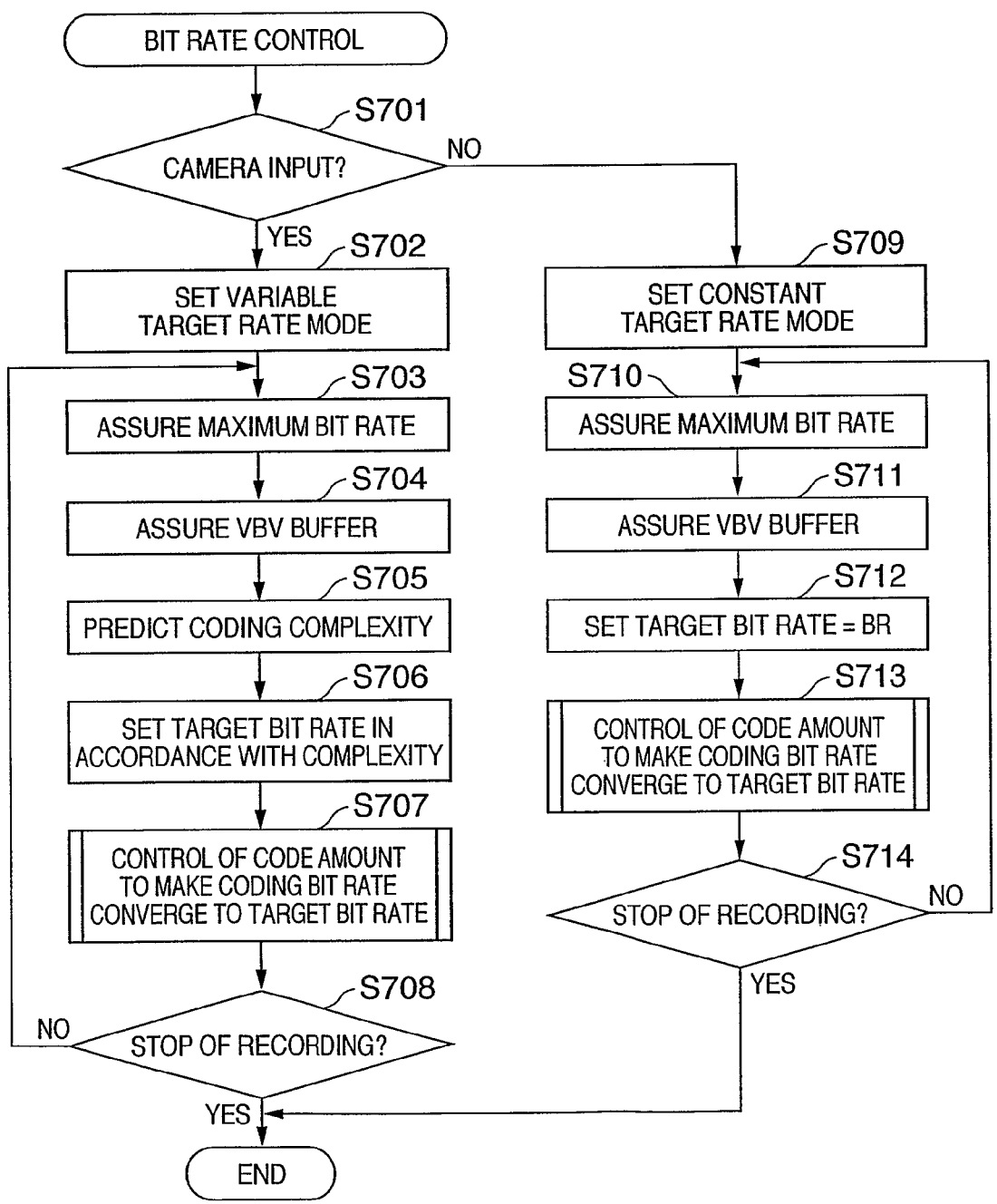
FIG. 7 is a flowchart showing the operation of bit rate control according to the second embodiment.

FIG. 7 is a flowchart showing bit rate control processing according to the second embodiment.

When the start of recording is designated with a switch (not shown), the flow starts to determine whether a moving image from a camera 101 is selected by a selection switch 124 (S701). If a moving image from the camera 101 is selected, the rate control setting circuit 126 selects a variable target rate mode in which the target bit rate is changed in accordance with the coding complexity, as shown in FIG. 6. The rate control setting circuit 126 sets the mode for the rate control circuit 127 (S702).

Similar to FIG. 4, maximum bit rate assurance processing (S703) and VBV buffer assurance processing (S704) are executed. The rate control circuit 127 obtains DPRD by predicting coding complexity from the past generated code amount, image feature amount, and the like (S705). Based on this DPRD, the rate control circuit 127 obtains BR (DPRD) corresponding to the coding complexity, and sets it as a target bit rate (S706). The rate control circuit 127 controls the generated code amount so that the coding bit rate converges to the target bit rate (S707). Processing from S703 to S707 is executed every predetermined period until the stop of recording is designated (S708).

If not a camera input but an externally input moving image is selected in S701, the rate control setting circuit 126 selects a constant target rate mode in which the target bit rate is set to a constant value, as shown in FIG. 5. The rate control setting circuit 126 sets the mode for the rate control circuit 127 (S709).

Similar to FIG. 4, maximum bit rate assurance processing (S710) and VBV buffer assurance processing (S711) are executed. The rate control circuit 127 sets the target bit rate to a predetermined value BR regardless of the coding complexity (S712), and controls the generated code amount so that the coding bit rate converges to the target bit rate (S713). Processing from S709 to S713 is executed every predetermined period until the stop of recording is designated (S714).

According to the second embodiment, when an image input from the camera is to be recorded, encoded moving image data can be recorded with almost constant degradation of the image quality regardless of an image even upon a change in coding complexity. When an externally input image is to be recorded, the coding bit rate is set to a constant target rate, assuring the recording time.

(Third Embodiment)

The third embodiment will be explained.

Figure 8:
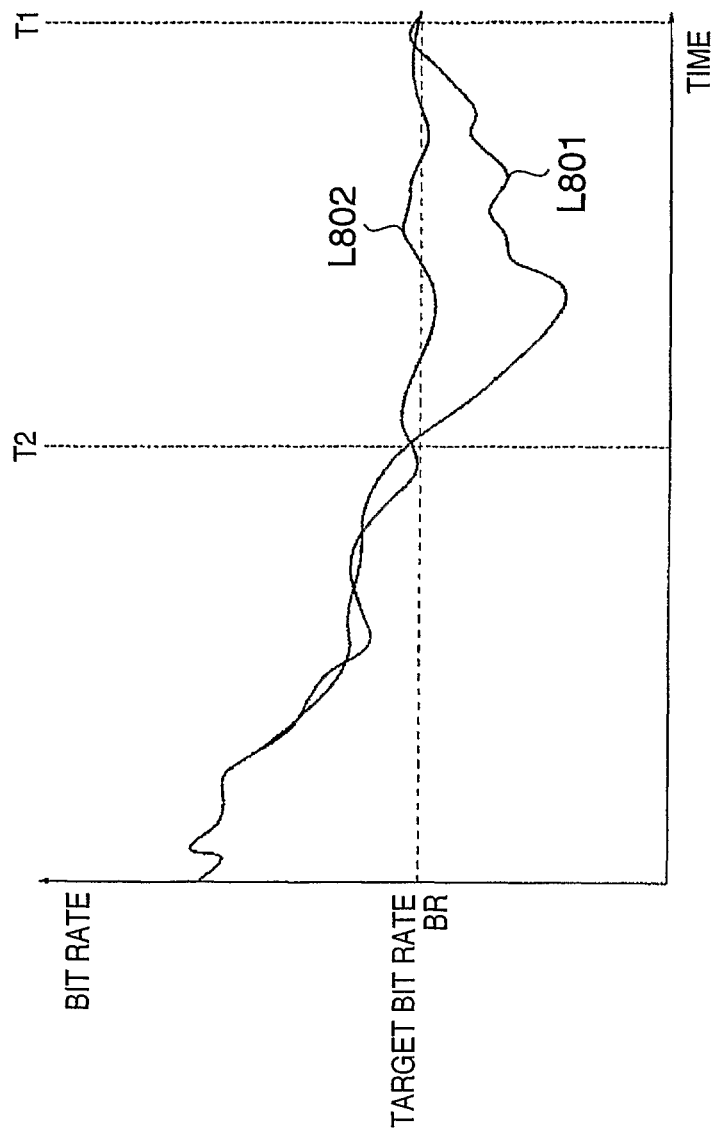
FIG. 8 is a timing chart showing an example of bit rate control according to the third embodiment.

FIG. 8 is a timing chart showing the coding bit rate generated as a result of control according to the third embodiment.

In the third embodiment, it is switched between a case wherein a moving image from the camera is recorded and a case wherein an externally input moving image is recorded, whether to control the generated code amount so that the average bit rate after the start of recording converges to a target value or to control the generated code amount so that the average bit rate in a predetermined period converges to a target value. Also in the third embodiment, the configuration of a recording apparatus is the same as that in FIG. 1, and a detailed description thereof will be omitted.

In FIG. 8, L801 represents an example of a change of the coding bit rate per unit time as a result of controlling the generated code amount, as described above, when a moving image from an external input terminal 104 is selected. In L801, the coding bit rate comes close to a target bit rate BR at time T2. An excess of the total generated code amount after the start of recording over the target bit rate is canceled, and the total generated code amount after the start of recording is adjusted close to the target bit rate BR x the period up to current time T1 after the start of recording. For this purpose, even after time T2, the generated code amount is suppressed, and the total average bit rate up to current time T1 after the start of recording is controlled to BR.

L802 represents an example of a change of the coding bit rate per unit time as a result of controlling the code amount, as described above, when an input from a camera 101 is selected. In L802, the coding bit rate is controlled close to the target bit rate BR without suppressing the generated code amount any more after the coding bit rate converges to the target bit rate at time T2.

Figure 9:
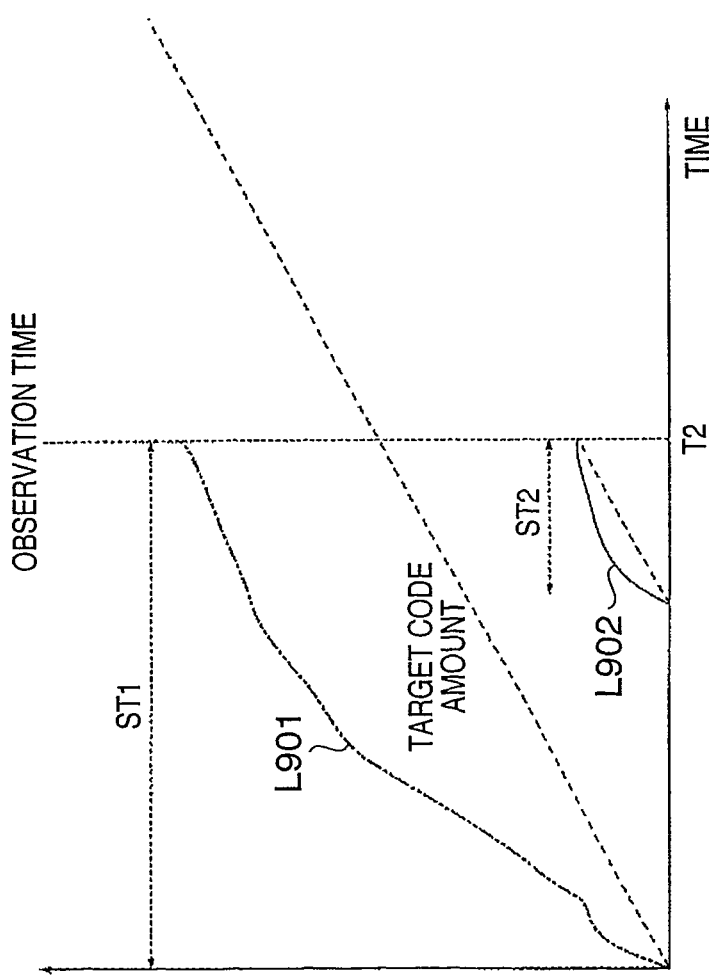
FIG. 9 is a timing chart showing an example of bit rate control according to the third embodiment.

FIG. 9 is a timing chart showing the average bit rate calculation period set by a rate control circuit 127 in order to perform the above control, and the code amount generated during the period.

L901 represents the total generated code amount after the start of recording when coding is done by comparing, with the target bit rate BR, the total average bit rate during a period ST1 up to the current time after the start of recording. At time T2, the gradient of the generated code amount coincides with that of an increase in target code amount. However, the total generated code amount exceeds the target code amount, so the code amount is suppressed even after T2, as represented by L801.

L902 represents the code amount generated during a predetermined period ST2 when coding is done by comparing the average bit rate with the target bit rate every predetermined period ST2. In L902, after the average bit rate during the period ST2 reaches the target bit rate, the generated code amount is not reduced more than the target bit rate, unlike L801.

Figure 10:
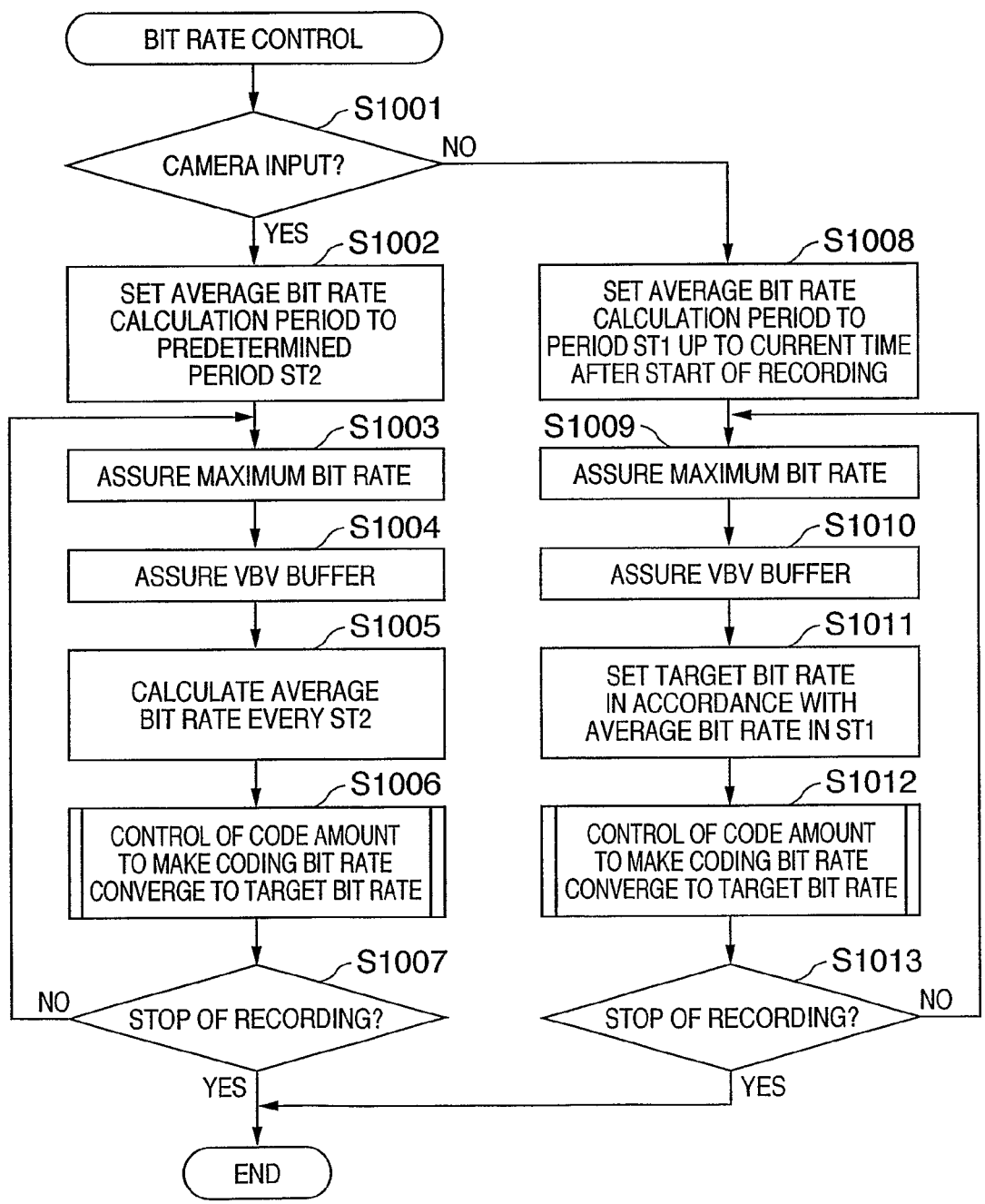
FIG. 10 is a flowchart showing the operation of bit rate control according to the third embodiment.

FIG. 10 is a flowchart showing bit rate control processing according to the third embodiment.

When the start of recording is designated with a switch (not shown), the flow starts to determine whether a moving image from the camera 101 is selected by a selection switch 124 (S1001). If a moving image from the camera 101 is selected, a rate control setting circuit 126 sets the rate control circuit 127 so as to calculate an average bit rate every predetermined period ST2 (S1002).

Similar to FIG. 4, maximum bit rate assurance processing (S1003) and VBV buffer assurance processing (S1004) are executed. The rate control circuit 127 calculates an average bit rate every set period ST2 (S1005), and controls the generated code amount so that the average bit rate converges to the target bit rate (S1006). Processing from S1003 to S1006 is executed every predetermined period until the stop of recording is designated (S1007).

If not a camera input but an externally input moving image is selected in S1001, the rate control setting circuit 126 sets the rate control circuit 127 so as to calculate an average bit rate during the period ST1 up to the current time after the start of recording, and control the code amount (S1008).

Similar to FIG. 4, maximum bit rate assurance processing (S1009) and VBV buffer assurance processing (S1010) are executed. The rate control circuit 127 calculates an average bit rate during the period ST1 up to the current time after the start of recording (S1011), and controls the generated code amount so that the average bit rate converges to the target bit rate (S1012). Processing from S1009 to S1012 is executed every predetermined period until the stop of recording is designated (S1013).

According to the third embodiment, when a moving image from the camera is to be recorded, a high-quality moving image can be recorded without degrading the image quality after the bit rate converges to the target bit rate. When an externally input image is to be recorded, coding which assures the recording time can be achieved.

(Fourth Embodiment)

The fourth embodiment will be explained.

In the fourth embodiment, whether to perform control of making the data rate of encoded data converge to a target bit rate is switched between a case wherein a moving image from the camera is recorded and a case wherein an externally input moving image is recorded. Also in the fourth embodiment, the schematic configuration view of a recording apparatus is FIG. 1, and a description thereof will be omitted.

Figure 11:
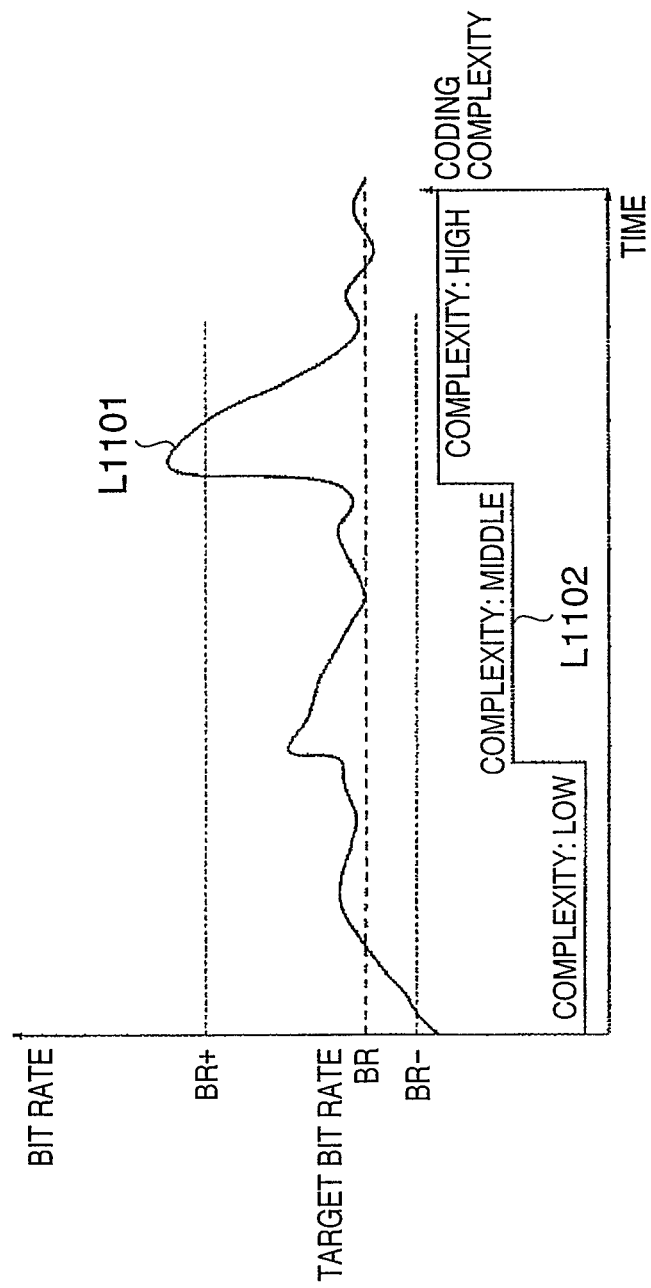
FIG. 11 is a timing chart showing an example of bit rate control according to the fourth embodiment.

FIG. 11 is a timing chart showing a change of the coding bit rate per unit time in the use of both target bit rate range assurance serving as short-period code amount control, and convergence control of making the average value of the generated code amount during a predetermined period converge to a target bit rate.

L1101 represents a change of the coding bit rate per unit time, and L1102 represents the coding complexity. If the coding complexity changes, the generated code amount temporarily changes, but the coding bit rate converges to a target bit rate BR upon the lapse of a predetermined convergence time.

In the fourth embodiment, an upper limit target BR+ and lower limit target BR− of the bit rate of encoded moving image data are set on the basis of the target bit rate BR. Bit rate range assurance processing is executed to perform short-period control so that the data rate of encoded moving image data falls within the target bit rate range of the upper limit target BR+ to the lower limit target BR−. Note that the upper limit target BR+ is set as an allowable range in accordance with the value of the target bit rate, and is different from a maximum bit rate set by the maximum recording rate and transmission rate of a medium that are assured in maximum bit rate assurance processing executed in the above embodiments.

Figure 12:
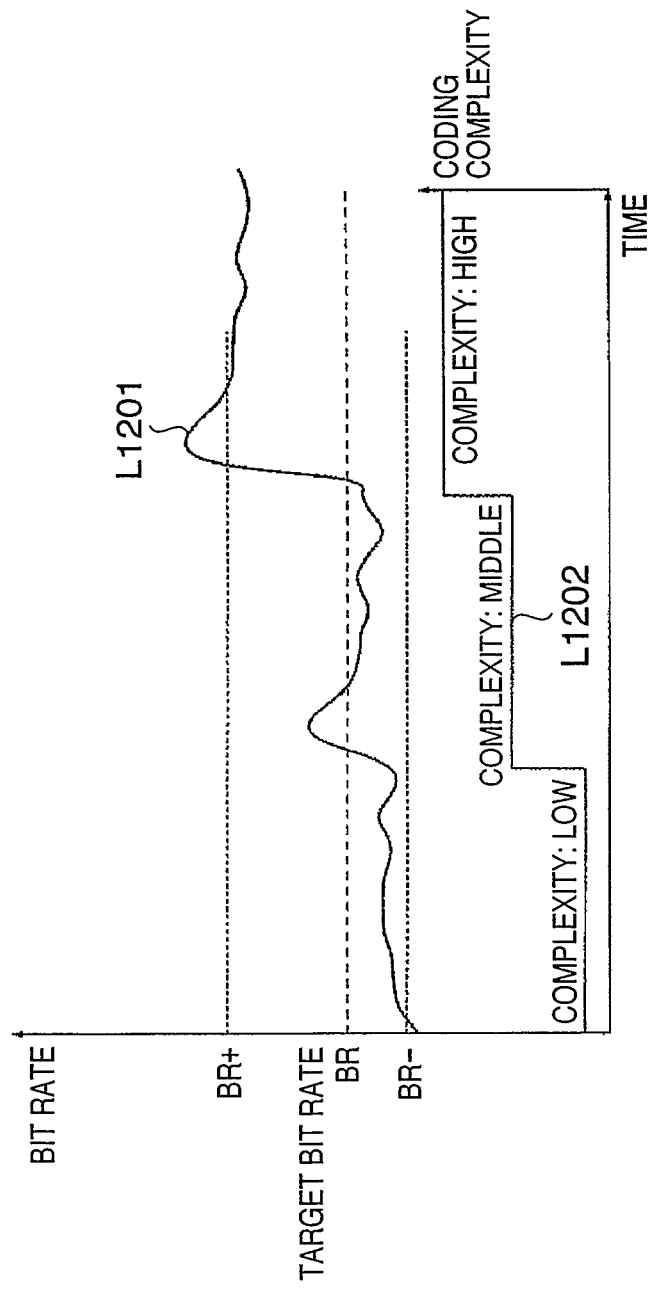
FIG. 12 is a timing chart showing an example of bit rate control according to the fourth embodiment.

FIG. 12 is a timing chart showing a change of the coding bit rate per unit time when only target bit rate range assurance processing serving as short-period code amount control is adopted, and convergence control of making the average value of the generated code amount during a predetermined period converge to a target bit rate is not executed.

L1201 represents a change of the coding bit rate per unit time, and L1202 represents the coding complexity. If the coding complexity changes, the generated code amount varies in the target bit rate range of BR+ to BR−, but convergence processing of the coding data rate to the target bit rate BR is not executed.

In the fourth embodiment, a rate control setting circuit 126 switches and sets these two target bit rate control characteristics. More specifically, the rate control setting circuit 126 sets a rate control circuit 127 so as to execute control shown in FIG. 12 when a moving image input from the camera is selected, and control shown in FIG. 11 when an externally input image is selected. Accordingly, target bit rate control corresponding to an input signal can be implemented.

Figure 13:
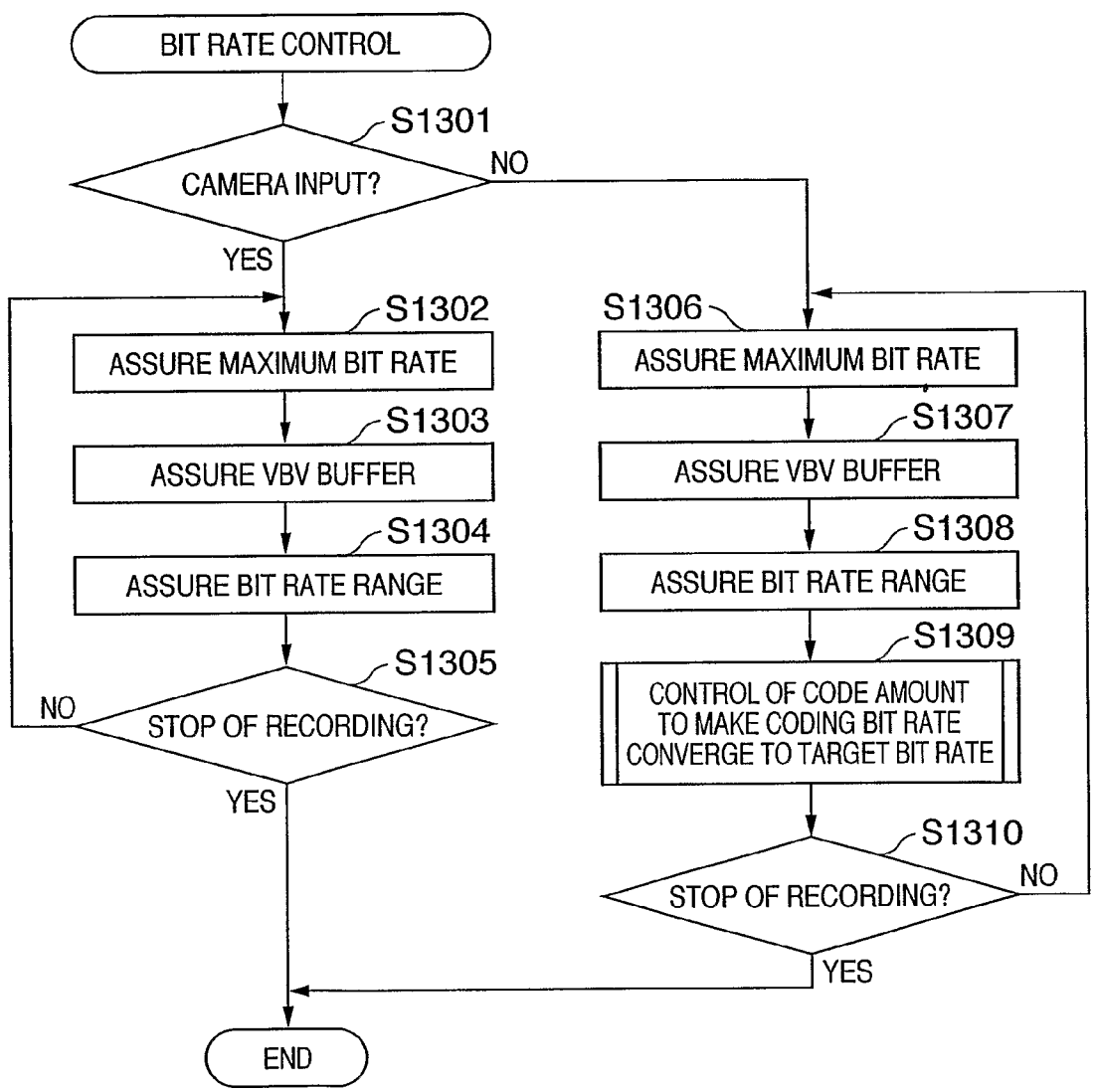
FIG. 13 is a flowchart showing the operation of bit rate control according to the fourth embodiment.
Figure 14:
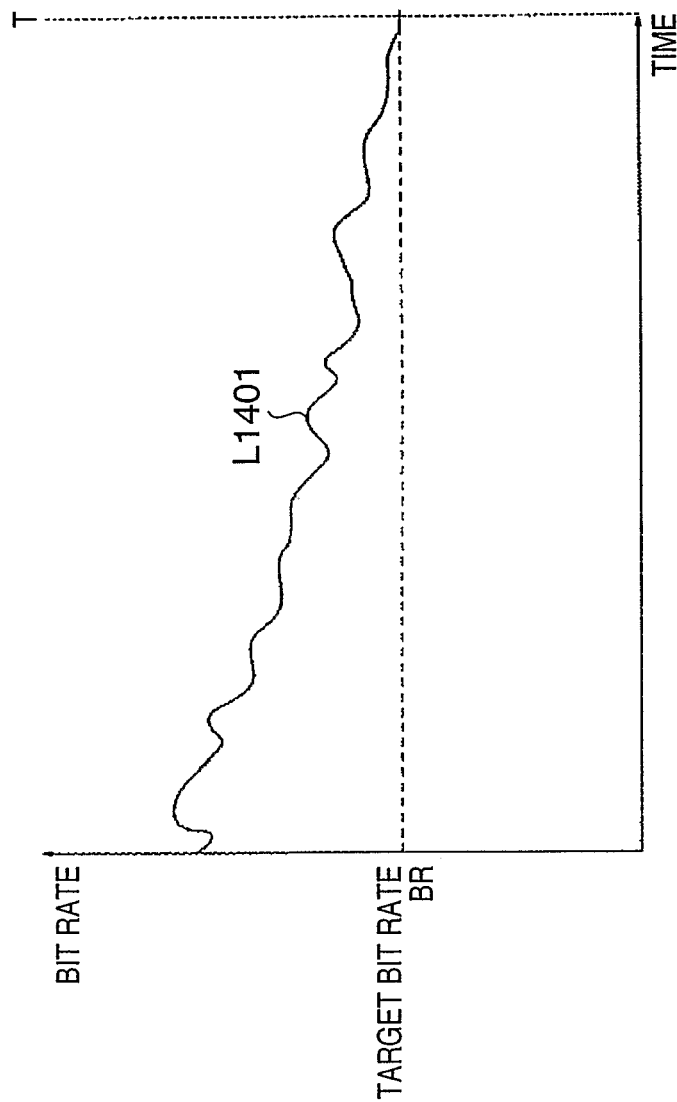
FIG. 14 is a timing chart showing an example of conventional bit rate control.

FIG. 13 is a flowchart showing bit rate control processing according to the fourth embodiment.

When the start of recording is designated with a switch (not shown), the flow starts to determine whether a moving image from a camera 101 is selected by a selection switch 124 (S1301). If a moving image from the camera 101 is selected, the rate control setting circuit 126 sets, for the rate control circuit 127, a mode in which only bit rate range assurance processing is done, as shown in FIG. 12.

Similar to FIG. 4, the rate control circuit 127 executes maximum bit rate assurance processing (S1302) and VBV buffer assurance processing (S1303). The rate control circuit 127 executes bit rate assurance processing to perform short-period code amount control for each picture, each GOP, or the like so that the data rate of encoded data falls within the allowable bit rate range of BR+ to BR− set for the target bit rate BR (S1304). Processing from S1302 to S1304 is executed every predetermined period until the stop of recording is designated (S1305).

If not a camera input but an externally input moving image is selected in S1301, the rate control setting circuit 126 sets, for the rate control circuit 127, a mode in which convergence processing to the target bit rate is done in addition to bit rate range assurance processing, as shown in FIG. 11.

Similar to FIG. 4, the rate control circuit 127 executes maximum bit rate assurance processing (S1306), VBV buffer assurance processing (S1307), and bit rate range assurance processing (S1308). The rate control circuit 127 executes code amount control processing so that the data rate of encoded moving image data converges to the target bit rate in a predetermined convergence time (S1309). Processing from S1306 to S1309 is executed every predetermined period until the stop of recording is designated (S1310).

According to the fourth embodiment, when a moving image from the camera is to be recorded, the bit rate is changed within the allowable range in accordance with the coding complexity without making the data rate of encoded data converge to the target bit rate itself. With this processing, an image can be recorded with almost constant degradation of the image quality regardless of an image. When an externally input image is to be recorded, recording which gives priority to the precision of the recording time, similar to a stay-at-home type recorder, can be achieved.

Note that the first to fourth embodiments have described an apparatus which selectively encodes and records moving image data photographed by a camera and external moving image data. However, the present invention is not limited to this, and can also be easily applied to any configuration which has a plurality of input sources, and encodes and records moving image data from each input source. In this case, the same effects as those described above can be obtained.

According to the first to fourth embodiments, code amount control processing can be changed in accordance with the input source, thus flexibly switching between code amount control processing which gives priority to the recording image quality, and code amount control processing which gives priority to the recording time or the like.

(Fifth Embodiment)

Figure 15:
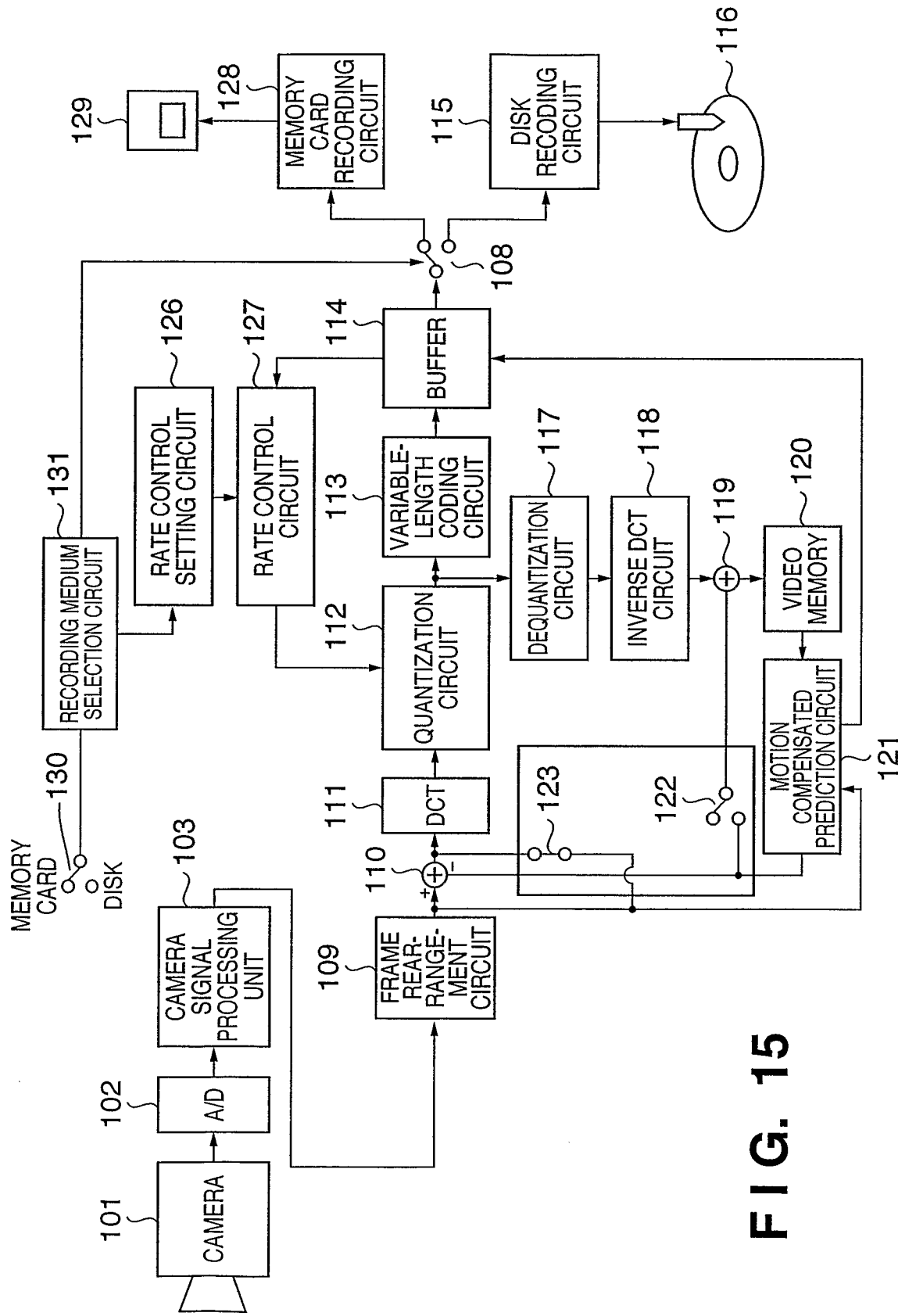
FIG. 15 is a block diagram showing the schematic configuration of a recording apparatus according to the fifth to eighth embodiments to which the present invention is applied.

FIG. 15 is a block diagram showing a schematic configuration according to the fifth embodiment of the present invention.

In FIG. 15, the same reference numerals as those in FIG. 1 showing the first embodiment denote the same functional parts, and a detailed description thereof will be omitted.

In the apparatus of FIG. 15, image data is recorded on a memory card 129 in addition to an optical medium 116, and played back from it.

More specifically, as described with reference to FIG. 1, encoded data stored in a buffer 114 is read out at recording rates to the memory card 129 and optical medium 116 serving as recording media which receive data via a switch 108.

In the fifth embodiment, the user can operate a switch 130 to arbitrarily select a moving image data recording medium from the memory card 129 and optical medium 116. A video camera according to the fifth embodiment comprises a memory card slot and disk slot. When the memory card 129 is selected by the switch 130, a recording medium selection circuit 131 connects the switch 108 to a memory card recording circuit 128. The memory card recording circuit 128 performs processes such as packetization and multiplexing for encoded moving image data read out from the buffer 114, and records the processed data on the memory card 129 inserted into the card slot. When a disk is selected by the switch 130, the recording medium selection circuit 131 connects the switch 108 to a disk recoding circuit 115. The disk recoding circuit 115 performs processes such as packetization for encoded moving image data read out from the buffer 114, and records the processed data on the disk 116.

Coefficient data quantized by a quantization circuit 112 is dequantized by a dequantization circuit 117, and undergoes inverse DCT transform by an inverse DCT circuit 118, in order to obtain predicted image data.

In encoding an I picture, an addition circuit 119 directly outputs data having undergone inverse DCT transform in accordance with selection by a switch 122. In encoding a P or B picture, the addition circuit 119 adds transformed data and predicted image data output from a motion compensated prediction circuit 121, and saves the resultant data as a locally decoded image in a video memory 120.

The motion compensated prediction circuit 121 compares the locally decoded image accumulated in the video memory 120 with an input image, and generates predicted image data having undergone motion compensation. The motion compensated prediction circuit 121 supplies the predicted image data to a difference circuit 110, and also supplies the data as a predicted image for the next local decoding to the addition circuit 119.

A rate control setting circuit 126, which is a feature of the fifth embodiment, changes the coding rate control parameter of a rate control circuit 127 on the basis of the selection result by the recording medium selection circuit 131. Details of a change of the control parameter will be described later.

The rate control circuit 127 controls the value of a quantization scale Q for the quantization circuit 112, and controls the generated code amount by using information such as the generated code amount and buffer occupancy obtained from the buffer 114. In the fifth embodiment, the rate control setting circuit 126 sets a parameter for controlling the code amount in accordance with the type of recording medium selected by the selection switch 130.

FIG. 2 is a timing chart showing the coding bit rate of moving image data generated upon switching of coding bit rate control according to the fifth embodiment.

In the fifth embodiment, the convergence time until the coding bit rate converges to a target bit rate is switched between a case wherein the memory card 129 is selected as a recording medium and a case wherein the disk 116 is selected. L201 represents a change of the coding bit rate per unit time when the disk 116 is selected. In L201, the coding bit rate converges to a target bit rate BR in a convergence time T1. L202 represents a change of the coding bit rate per unit time when the memory card 129 is selected. In L202, the coding bit rate converges to the target bit rate in a convergence time T2 much shorter than T1.

FIG. 3 is a timing chart showing the threshold of the average bit rate set by the rate control circuit 127 in order to perform the above-described control. L301 represents the threshold of the average bit rate in a predetermined period when the convergence time is T1. If the current average bit rate is higher than L301 with respect to the elapsed time, the generated code amount is too large for the target bit rate. Thus, the quantization scale is controlled large to make the average bit rate converge to the target bit rate.

L302 represents the threshold of the average bit rate in a predetermined period when the convergence time is T2. The same control as that for L301 is executed to make the average bit rate converge to the target bit rate in the convergence time T2. In the fifth embodiment, the rate control setting circuit 126 sets the target bit rate control operation in the rate control circuit 127 in accordance with the selection result of the recording medium selection circuit 131 from the memory card 129 and disk 116.

The rate control setting circuit 126 sets the rate control circuit 127 so as to select L302 in FIG. 3 when the memory card 129 is selected, and L301 when the disk 116 is selected.

With this setting, the convergence time until the coding bit rate reaches a target bit rate can be controlled in accordance with the recording medium.

Figure 16:
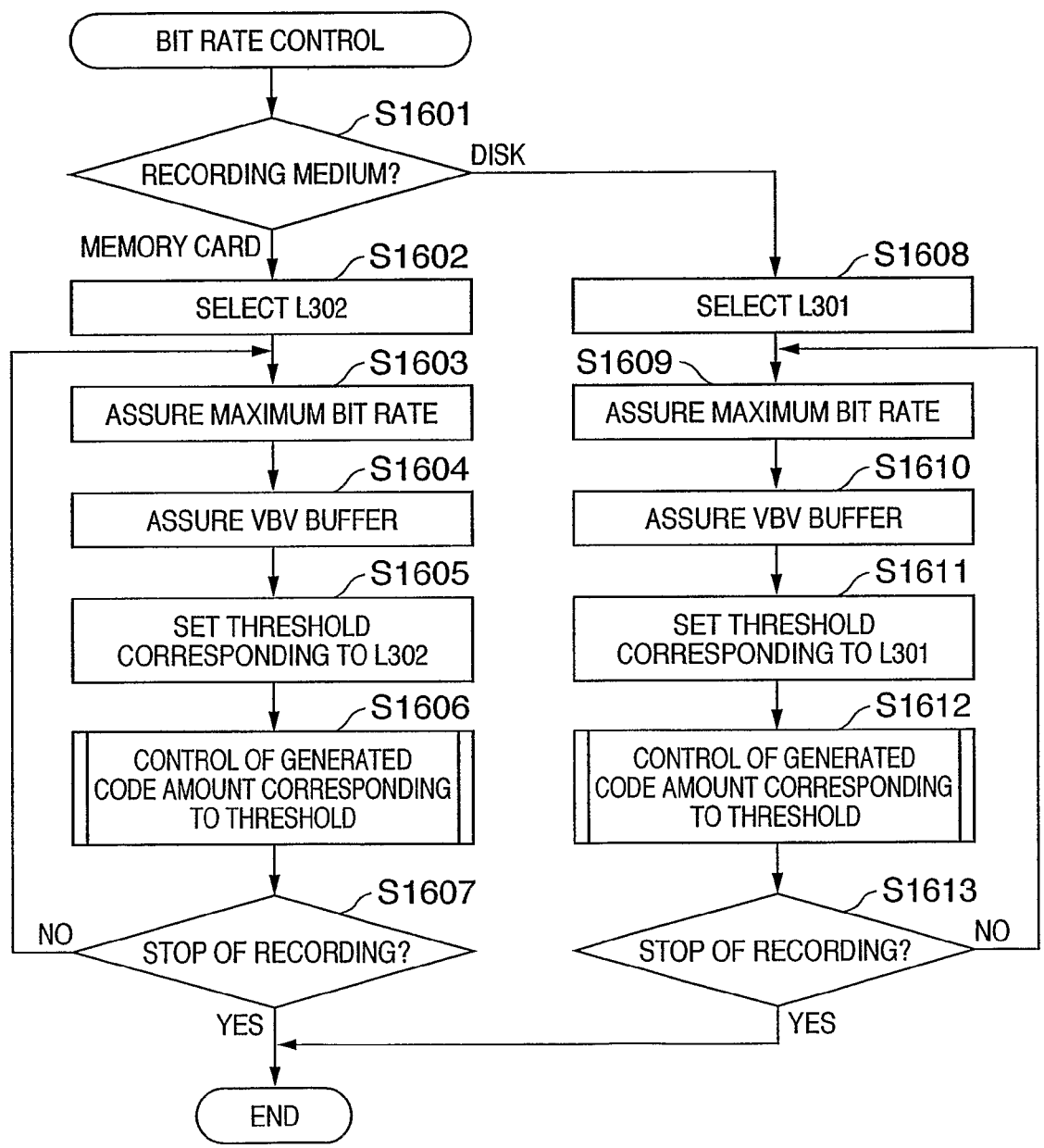
FIG. 16 is a flowchart showing the operation of bit rate control according to the fifth embodiment of the present invention.

FIG. 16 is a flowchart showing bit rate control processing according to the fifth embodiment.

When the start of recording is designated with a switch (not shown), the flow starts to determine which of the recording media is selected by the selection switch 130 (S1601). If the memory card 129 is selected, the rate control setting circuit 126 controls the rate control circuit 127 so as to select L302 in FIG. 3 as the threshold of the average bit rate (S1602).

Then, maximum bit rate assurance processing (S1603) and VBV buffer assurance processing (S1604) are performed. In maximum bit rate assurance processing, in addition to the target bit rate, the current quantization scale is controlled not to exceed the upper limit of recording such as the maximum transfer rate. In VBV buffer assurance processing, the current quantization scale is controlled to prevent overflow and underflow of a virtual buffer called VBV in MPEG-2. Note that no overflow occurs in principle in variable bit rate coding. The coding control processes in S1603 and S1604 are general ones, examples of them are described in Japanese Patent Laid-Open No. 2000-197048, and a detailed description thereof will be omitted.

The threshold of the average bit rate is set on the basis of L302 and the time elapsed after the start of recording (S1605). The set threshold of the average bit rate and a calculated average bit rate are compared to control the generated code amount (S1606). Bit rate control processing from S1603 to S1606 is repeated every predetermined period until the stop of recording is designated. As a result, the coding bit rate of moving image data converges to the target bit rate (S1607).

In L302, the change degree of the threshold of the target bit rate to the elapsed time is larger than that in L301. In code amount control, the generated code amount is controlled while the value of the quantization scale is greatly changed.

If the disk 116 is selected in S1601, the rate control setting circuit 126 controls the rate control circuit 127 so as to select L301 in FIG. 3 as the threshold of the average bit rate (S1608).

Then, maximum bit rate assurance processing (S1609) and VBV buffer assurance processing (S1610) are performed. The threshold of the average bit rate is set on the basis of L301 and the time elapsed after the start of recording (S1611). The set threshold of the average bit rate and the current average bit rate are compared to control the generated code amount (S1612). Bit rate control processing from S1609 to S1612 is repeated every predetermined period until the stop of recording is designated. Accordingly, the coding bit rate of moving image data converges to the target bit rate (S1613).

According to the fifth embodiment, when a moving image is to be recorded on the memory card, the coding bit rate converges to a target bit rate in a shorter time than the time when a moving image is to be recorded on the disk. Even if photographing of a relatively short time is repeated, no recording time greatly varies. When a moving image is to be recorded on the disk, the coding bit rate converges to the target bit rate in a long period. Optimal code amount distribution can be expected, and both the recording time and image quality can be satisfied.

(Sixth Embodiment)

The sixth embodiment will be explained.

FIGS. 5 and 6 are timing charts showing the bit rate of encoded data generated as a result of coding bit rate control according to the sixth embodiment.

In the sixth embodiment, whether to control the code amount using coding complexity is switched between a case wherein a moving image is recorded on a memory card and a case wherein a moving image is recorded on a disk. More specifically, when moving image data is to be recorded on the memory card, the code amount is controlled so that the data rate of encoded moving image data converges to a target data rate regardless of the image state (coding complexity), which will be described later. To the contrary, when moving image data is to be recorded on the disk and an image less changes at low coding complexity, the code amount is controlled so that the data rate converges to a target data rate. If the coding complexity becomes high, the set value of the target data rate is changed high to forcibly avoid convergence to a predetermined target data rate. Also in the sixth embodiment, the configuration of a recording apparatus is the same as that in FIG. 15, and a detailed description thereof will be omitted.

FIG. 5 is a timing chart showing a change of the coding bit rate per unit time when the target bit rate is set to a constant value BR regardless of the coding complexity of a moving image to be encoded. L501 represents a change of the coding bit rate per unit time, and L502 represents the coding complexity. If the coding complexity changes, the generated code amount temporarily changes, but the coding bit rate converges to the target bit rate BR upon the lapse of a predetermined convergence time.

In this case, the data rate of encoded moving image data can be set constant.

FIG. 6 is a timing chart showing a change of the coding bit rate per unit time when the coding complexity of a moving image to be encoded is high and the target bit rate is changed to BR (DPRD). DPRD is a predicted value for coding complexity D, and is estimated using the past generated code amount, image feature amount, and the like. L601 represents a change of the coding bit rate per unit time, and L602 represents the coding complexity.

If the coding complexity is equal to or lower than a predetermined level, the target bit rate is set to a constant value, similar to FIG. 5. If the coding complexity changes high, the target bit rate BR (DPRD) is changed in accordance with the changed coding complexity. Although the generated code amount (compression ratio) changes, the target bit rate can be so controlled as to reduce the difference in degradation of the image quality depending on the coding complexity.

In the sixth embodiment, when a moving image is to be recorded on a disk 116, the code amount is controlled while the target bit rate is changed in accordance with the coding complexity, as shown in FIG. 6. When a moving image is to be recorded on a memory card 129, the code amount is controlled at a constant target bit rate, as shown in FIG. 5. A rate control setting circuit 126 switches and sets these two target bit rate control characteristics for a rate control circuit 127.

Figure 17:
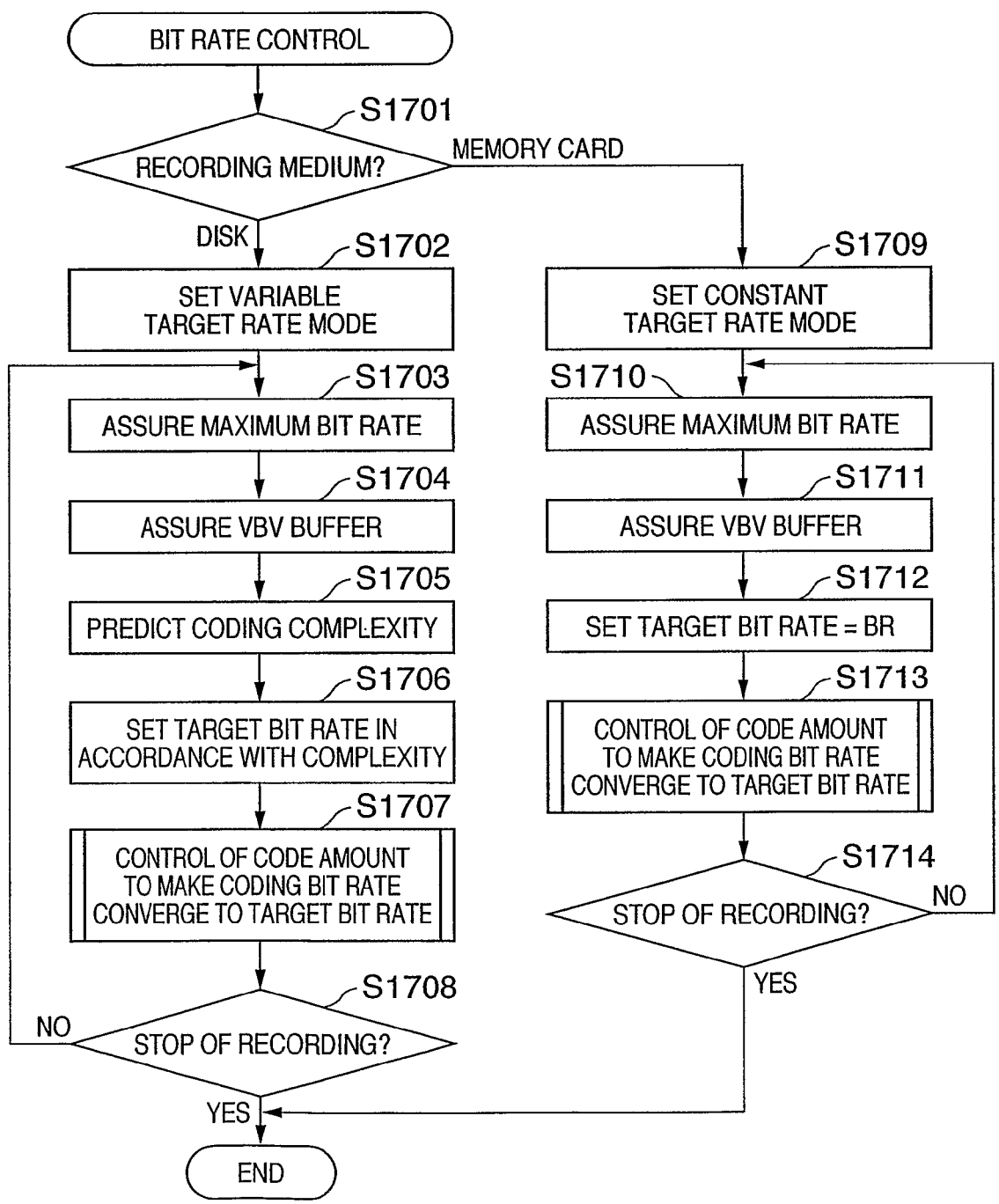
FIG. 17 is a flowchart showing the operation of bit rate control according to the sixth embodiment.

FIG. 17 is a flowchart showing bit rate control processing according to the sixth embodiment.

When the start of recording is designated with a switch (not shown), the flow starts to determine which of the recording media is selected by a selection switch 130 (S1701). If the disk 116 is selected, the rate control setting circuit 126 selects a variable target rate mode in which the target bit rate is changed in accordance with the coding complexity, as shown in FIG. 6. The rate control setting circuit 126 sets the mode for the rate control circuit 127 (S1702).

Similar to FIG. 16, maximum bit rate assurance processing (S1703) and VBV buffer assurance processing (S1704) are executed. The rate control circuit 127 obtains DPRD by predicting coding complexity from the past generated code amount, image feature amount, and the like (S1705). Based on this DPRD, the rate control circuit 127 obtains BR (DPRD) corresponding to the coding complexity, and sets it as a target bit rate (S1706). The rate control circuit 127 controls the generated code amount so that the coding bit rate converges to the target bit rate (S1707). Processing from S1703 to S1707 is executed every predetermined period until the stop of recording is designated (S1708).

If the memory card 129 is selected in S1701, the rate control setting circuit 126 selects a constant target rate mode in which the target bit rate is set to a constant value, as shown in FIG. 5. The rate control setting circuit 126 sets the mode for the rate control circuit 127 (S1709).

Similar to FIG. 16, maximum bit rate assurance processing (S1710) and VBV buffer assurance processing (S1711) are executed. The rate control circuit 127 sets the target bit rate to a predetermined value BR regardless of the coding complexity (S1712), and controls the generated code amount so that the coding bit rate converges to the target bit rate (S1713). Processing from S1709 to S1713 is executed every predetermined period until the stop of recording is designated (S1714).

According to the sixth embodiment, when a moving image is to be recorded on the disk, encoded moving image data can be recorded with almost constant degradation of the image quality regardless of an image even upon a change in coding complexity. When a moving image is to be recorded on the memory card, the coding bit rate is set to a constant target rate, assuring the recording time.

(Seventh Embodiment)

The seventh embodiment will be explained.

FIG. 8 is a timing chart showing the coding bit rate generated as a result of control according to the seventh embodiment.

In the seventh embodiment, it is switched in accordance with a selected recording medium whether to control the generated code amount so that the average bit rate after the start of recording converges to a target value or to control the generated code amount so that the average bit rate in a predetermined period converges to a target value. Also in the seventh embodiment, the configuration of a recording apparatus is the same as that in FIG. 15, and a detailed description thereof will be omitted.

In FIG. 8, L801 represents an example of a change of the coding bit rate per unit time as a result of controlling the generated code amount, as described above, when a memory card 129 is selected. In L801, the coding bit rate comes close to a target bit rate BR at time T2. An excess of the total generated code amount after the start of recording over the target bit rate is canceled, and the total generated code amount after the start of recording is adjusted close to the target bit rate BR x the period up to current time T1 after the start of recording. For this purpose, even after time T2, the generated code amount is suppressed, and the total average bit rate up to current time T1 after the start of recording is controlled to BR.

L802 represents an example of a change of the coding bit rate per unit time as a result of controlling the code amount, as described above, when a disk 116 is selected. In L802, the coding bit rate is controlled close to the target bit rate BR without suppressing the generated code amount any more after the coding bit rate converges to the target bit rate at time T2.

FIG. 9 is a timing chart showing the average bit rate calculation period set by a rate control circuit 127 in order to perform the above control, and the code amount generated during the period.

L901 represents the total generated code amount after the start of recording when coding is done by comparing, with the target bit rate BR, the total average bit rate during a period ST1 up to the current time after the start of recording. At time T2, the gradient of the generated code amount coincides with that of an increase in target code amount. However, the total generated code amount exceeds the target code amount, so the code amount is suppressed even after T2, as represented by L801.

L902 represents the code amount generated during a predetermined period ST2 when coding is done by comparing the average bit rate with the target bit rate every predetermined period ST2. In L902, after the average bit rate during the period ST2 reaches the target bit rate, the generated code amount is not reduced more than the target bit rate, unlike L801.

Figure 18:
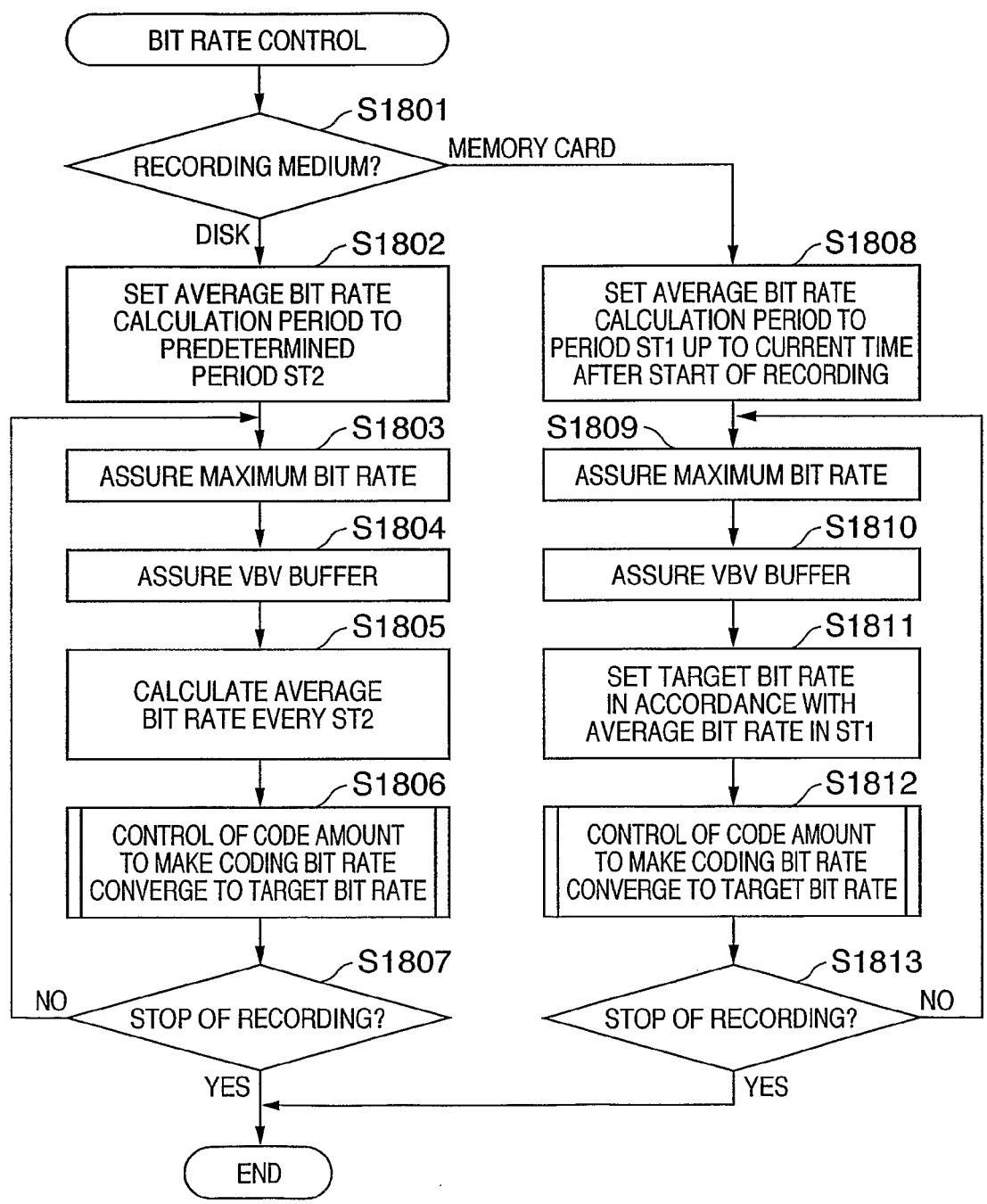
FIG. 18 is a flowchart showing the operation of bit rate control according to the seventh embodiment.

FIG. 18 is a flowchart showing bit rate control processing according to the seventh embodiment.

When the start of recording is designated with a switch (not shown), the flow starts to determine which of the recording media is selected by a selection switch 130 (S1801). If the disk 116 is selected, a rate control setting circuit 126 sets the rate control circuit 127 so as to calculate an average bit rate every predetermined period ST2 (S1802).

Similar to FIG. 16, maximum bit rate assurance processing (S1803) and VBV buffer assurance processing (S1804) are executed. The rate control circuit 127 calculates an average bit rate every set period ST2 (S1805), and controls the generated code amount so that the average bit rate converges to the target bit rate (S1806). Processing from S1803 to S1806 is executed every predetermined period until the stop of recording is designated (S1807).

If the memory card 129 is selected in S1801, the rate control setting circuit 126 sets the rate control circuit 127 so as to calculate an average bit rate during the period ST1 up to the current time after the start of recording, and control the code amount (S1808).

Similar to FIG. 16, maximum bit rate assurance processing (S1809) and VBV buffer assurance processing (S1810) are executed. The rate control circuit 127 calculates an average bit rate during the period ST1 up to the current time after the start of recording (S1811), and controls the generated code amount so that the average bit rate converges to the target bit rate (S1812). Processing from S1809 to S1812 is executed every predetermined period until the stop of recording is designated (S1813).

According to the seventh embodiment, when a moving image is to be recorded on the disk, a high-quality moving image can be recorded without degrading the image quality after the bit rate converges to the target bit rate. When a moving image is to be recorded on the memory card, coding which assures the recording time can be achieved.

(Eighth Embodiment)

The eighth embodiment will be explained.

In the eighth embodiment, whether to perform control of making the data rate of encoded data converge to a target bit rate is switched between a case wherein a moving image is recorded on a disk and a case wherein a moving image is recorded on a memory card. Also in the eighth embodiment, the schematic configuration view of a recording apparatus is FIG. 15, and a description thereof will be omitted.

FIG. 11 is a timing chart showing a change of the coding bit rate per unit time in the use of both target bit rate range assurance serving as short-period code amount control, and convergence control of making the average value of the generated code amount during a predetermined period converge to a target bit rate.

L1101 represents a change of the coding bit rate per unit time, and L1102 represents the coding complexity. If the coding complexity changes, the generated code amount temporarily changes, but the coding bit rate converges to a target bit rate BR upon the lapse of a predetermined convergence time.

In the eighth embodiment, an upper limit target BR+ and lower limit target BR− of the bit rate of encoded moving image data are set on the basis of the target bit rate BR. Bit rate range assurance processing is executed to perform short-period control so that the data rate of encoded moving image data falls within the target bit rate range of the upper limit target BR+ to the lower limit target BR−. Note that the upper limit target BR+ is set as an allowable range in accordance with the value of the target bit rate, and is different from a maximum bit rate set by the maximum recording rate and transmission rate of a medium that are assured in maximum bit rate assurance processing executed in the above embodiments.

FIG. 12 is a timing chart showing a change of the coding bit rate per unit time when only target bit rate range assurance processing serving as short-period code amount control is adopted, and convergence control of making the average value of the generated code amount during a predetermined period converge to a target bit rate is not executed.

L1201 represents a change of the coding bit rate per unit time, and L1202 represents the coding complexity. If the coding complexity changes, the generated code amount varies in the target bit rate range of BR+ to BR−, but convergence processing of the coding data rate to the target bit rate BR is not executed.

According to the present invention, a rate control setting circuit 126 switches and sets these two target bit rate control characteristics. More specifically, the rate control setting circuit 126 sets a rate control circuit 127 so as to execute control shown in FIG. 12 when the disk is selected as the recording medium, and control shown in FIG. 11 when the memory card is selected. Accordingly, target bit rate control corresponding to an input signal can be implemented.

Figure 19:
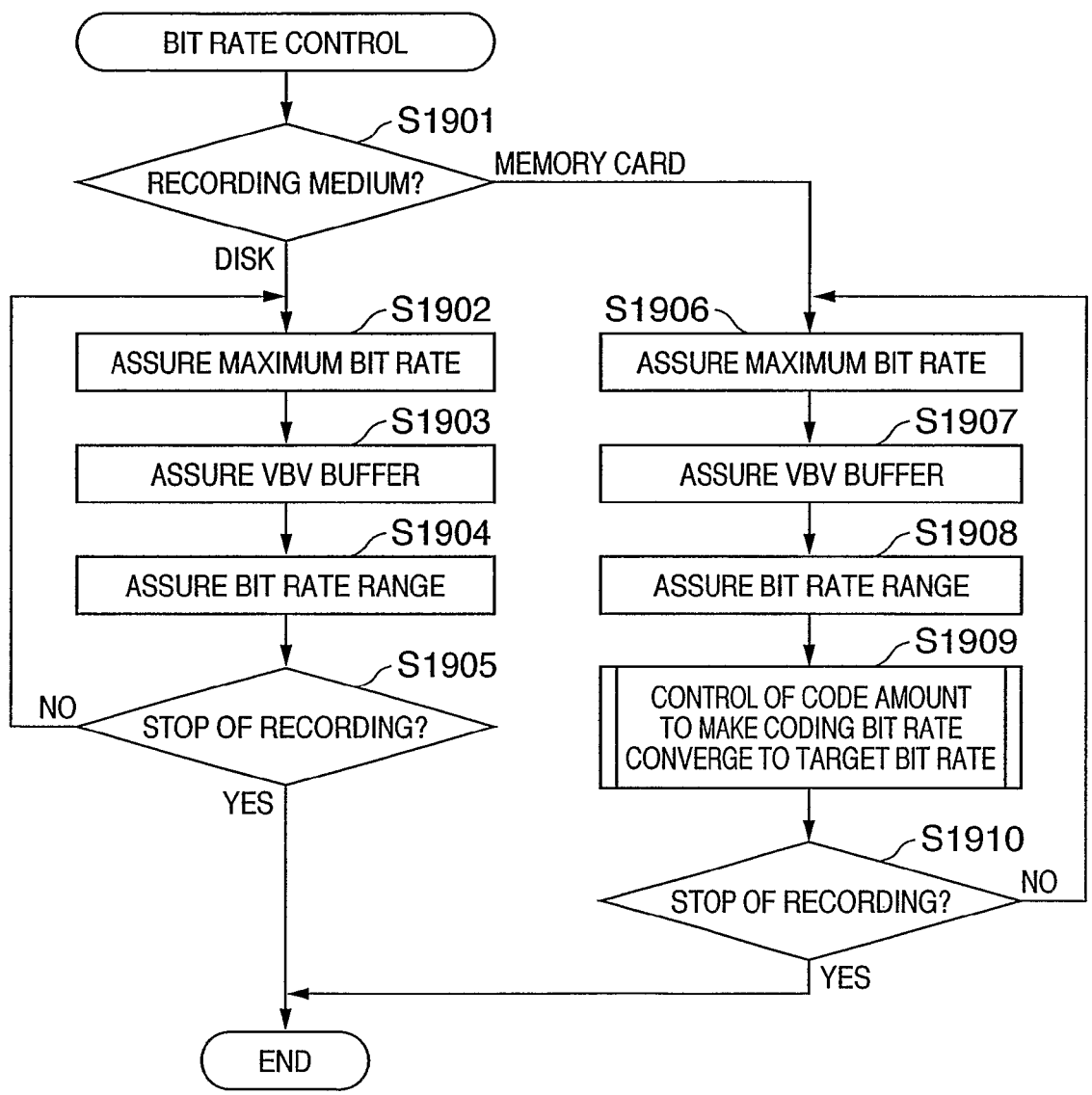
FIG. 19 is a flowchart showing the operation of bit rate control according to the eighth embodiment.

FIG. 19 is a flowchart showing bit rate control processing according to the eighth embodiment.

When the start of recording is designated with a switch (not shown), the flow starts to determine which of the disk and memory card is selected by a selection switch 130 (S1901). If a disk 116 is selected, the rate control setting circuit 126 sets, for the rate control circuit 127, a mode in which only bit rate range assurance processing is done, as shown in FIG. 12.

Similar to FIG. 16, the rate control circuit 127 executes maximum bit rate assurance processing (S1902) and VBV buffer assurance processing (S1903). The rate control circuit 127 executes bit rate assurance processing to perform short-period code amount control for each picture, each GOP, or the like so that the data rate of encoded data falls within the allowable bit rate range of BR+ to BR− set for the target bit rate BR (S1904). Processing from S1902 to S1904 is executed every predetermined period until the stop of recording is designated (S1905).

If a memory card 129 is selected in S1901, the rate control setting circuit 126 sets, for the rate control circuit 127, a mode in which convergence processing to the target bit rate is done in addition to bit rate range assurance processing, as shown in FIG. 11.

Similar to FIG. 16, the rate control circuit 127 executes maximum bit rate assurance processing (S1906), VBV buffer assurance processing (S1907), and bit rate range assurance processing (S1908). The rate control circuit 127 executes code amount control processing so that the data rate of encoded moving image data converges to the target bit rate in a predetermined convergence time (S1909). Processing from S1906 to S1909 is executed every predetermined period until the stop of recording is designated (S1910).

According to the eighth embodiment, when a moving image is to be recorded on the disk, the bit rate is changed within the allowable range in accordance with the coding complexity without making the data rate of encoded data converge to the target bit rate itself. An image can, therefore, be recorded with almost constant degradation of the image quality regardless of an image. When a moving image is to be recorded on the memory card, recording which gives priority to the precision of the recording time, similar to a stay-at-home type recorder, can be achieved.

Note that the fifth to eighth embodiments have described an apparatus which selectively encodes and records moving image data photographed by a camera and external moving image data. However, the present invention is not limited to this, and can also be easily applied to any configuration which has a plurality of input sources, and encodes and records moving image data from each input source. Also in this case, the same effects as those described above can be obtained.

According to the fifth to eighth embodiments, code amount control processing can be changed in accordance with the recording medium, thereby flexibly switching between code amount control processing which gives priority to the recording image quality, and code amount control processing which gives priority to the recording time or the like.

(Ninth Embodiment)

Figure 20:
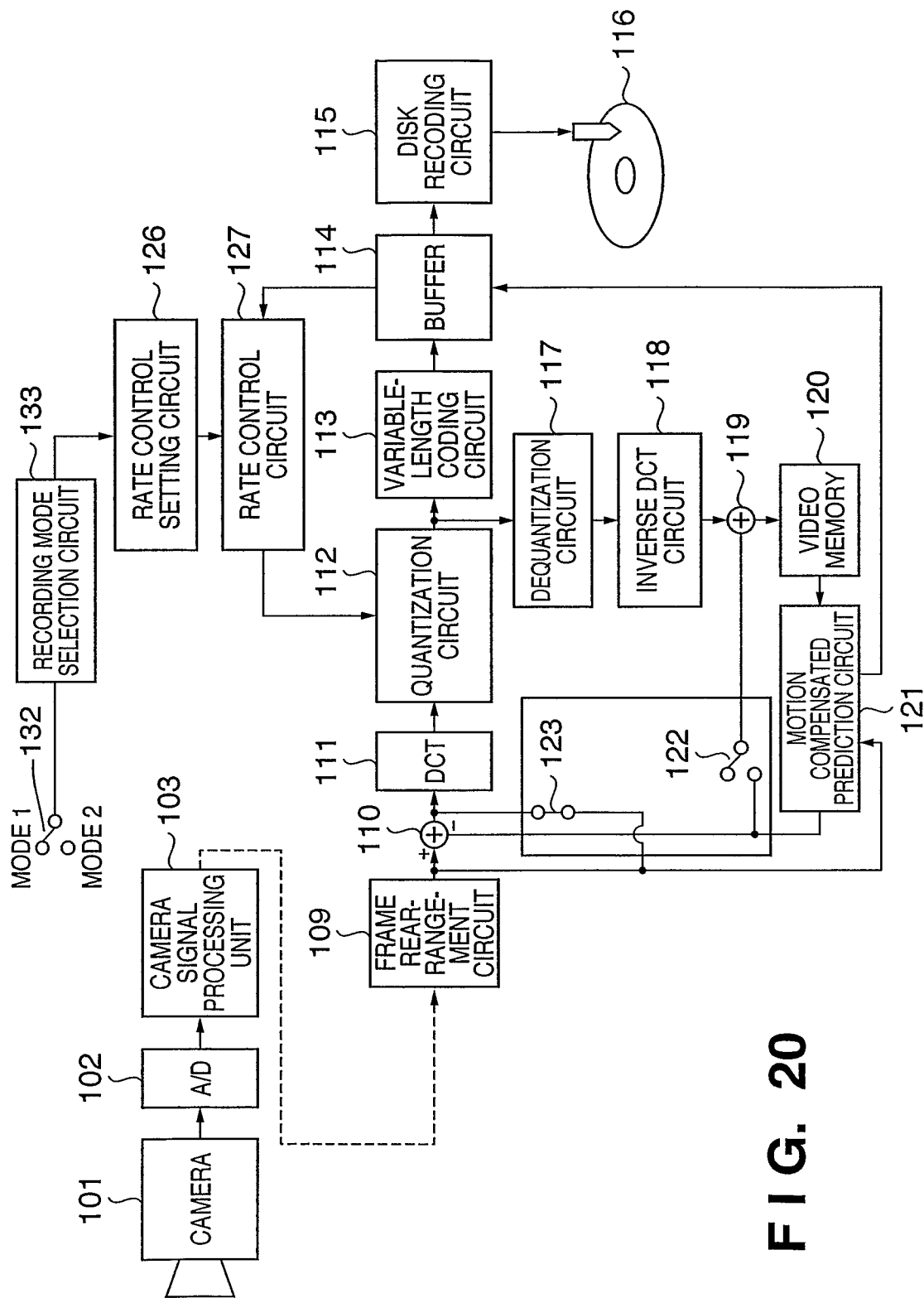
FIG. 20 is a block diagram showing the schematic configuration of a recording apparatus according to the ninth to 12th embodiments to which the present invention is applied.

FIG. 20 is a block diagram showing a schematic configuration according to the ninth embodiment of the present invention.

In FIG. 20, the same reference numerals as those in FIG. 1 showing the first embodiment denote the same functional parts, and a detailed description thereof will be omitted.

A video camera in FIG. 20 comprises a recording mode selection switch 132 and recording mode selection circuit 133.

The recording mode selection circuit 133 selects either of two modes 1 and 2 on the basis of the setting of the switch 132.

A rate control setting circuit 126 changes the coding rate control parameter of a rate control circuit 127 in accordance with a recording mode selected on the basis of an instruction from the recording mode selection circuit 133. Details of a change of the control parameter will be described later.

The rate control circuit 127 controls a quantization scale Q, and controls the generated code amount by using information such as the generated code amount and buffer occupancy obtained from a buffer 114. More specifically, the rate control setting circuit 126 sets a control parameter in accordance with each recording mode, and makes the data rate of encoded moving image data converge to a target bit rate.

In the ninth embodiment, the user arbitrarily switches the switch 132 to select one of the two recording modes (coding modes).

FIG. 2 is a timing chart showing the coding bit rate of moving image data generated upon switching of coding bit rate control according to the ninth embodiment.

In the ninth embodiment, the convergence time until the coding bit rate converges to a target bit rate is switched between the first recording mode and the second recording mode. L201 represents a change of the coding bit rate per unit time when the first mode is selected. In L201, the coding bit rate converges to a target bit rate BR in a convergence time T1.

L202 represents a change of the coding bit rate per unit time when the second mode is selected. In L202, the coding bit rate converges to the target bit rate in a convergence time T2 much shorter than T1.

FIG. 3 is a timing chart showing the threshold of the average bit rate set by the rate control circuit 127 in order to perform the above-described control. L301 represents the threshold of the average bit rate in a predetermined period when the convergence time is T1. If the current average bit rate is higher than L301 with respect to the elapsed time, the generated code amount is too large for the target bit rate. Thus, the quantization scale is controlled large to make the average bit rate converge to the target bit rate.

L302 represents the threshold of the average bit rate in a predetermined period when the convergence time is T2. The same control as that for L301 is executed to make the average bit rate converge to the target bit rate in the convergence time T2. In the ninth embodiment, the rate control setting circuit 126 sets the target bit rate control operation in the rate control circuit 127 in accordance with the selection result of the switch 132.

The rate control setting circuit 126 sets the rate control circuit 127 so as to select L301 in FIG. 3 when the first mode is selected, and L302 when the second mode is selected. With this setting, the convergence time until the coding bit rate reaches a target bit rate can be arbitrarily controlled in accordance with a photographing situation desired by the user.

Figure 21:
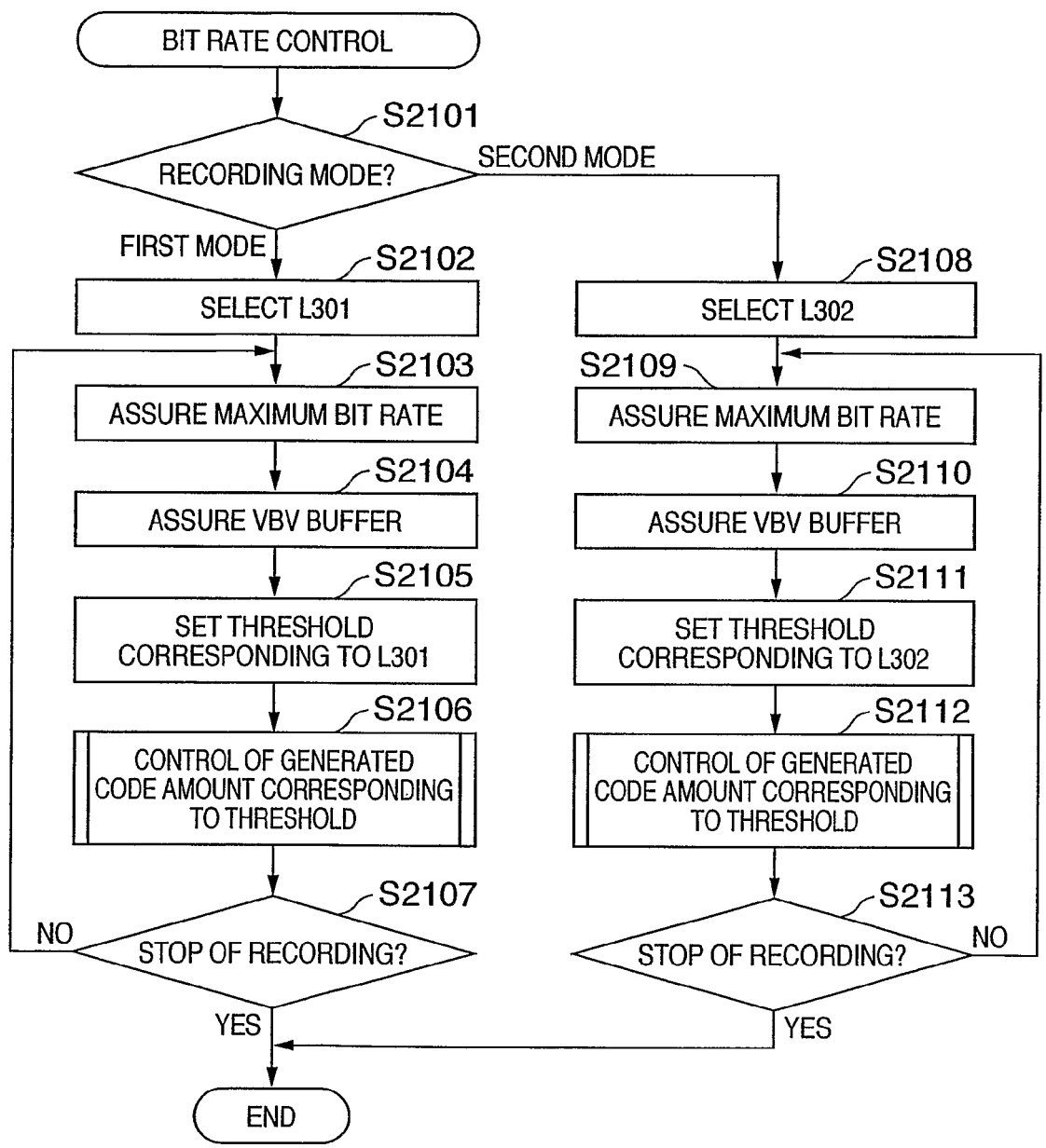
FIG. 21 is a flowchart showing the operation of bit rate control according to the ninth embodiment of the present invention.

FIG. 21 is a flowchart showing bit rate control processing according to the ninth embodiment.

When the start of recording is designated with a switch (not shown), the flow starts to determine which of the modes is selected by the selection switch 132 (S2101). If the first mode is selected, the rate control setting circuit 126 controls the rate control circuit 127 so as to select L301 in FIG. 3 as the threshold of the average bit rate (S2102).

Then, maximum bit rate assurance processing (S2103) and VBV buffer assurance processing (S2104) are performed. In maximum bit rate assurance processing, in addition to the target bit rate, the current quantization scale is controlled not to exceed the upper limit of recording such as the maximum transfer rate of a recording medium 116. In VBV buffer assurance processing, the current quantization scale is controlled to prevent overflow and underflow of a virtual buffer called VBV in MPEG-2. Note that no overflow occurs in principle in variable bit rate coding. The coding control processes in S2103 and S2104 are general ones, examples of them are described in Japanese Patent Laid-Open No. 2000-197048, and a detailed description thereof will be omitted.

The threshold of the average bit rate is set on the basis of L301 and the time elapsed after the start of recording (S2105). The set threshold of the average bit rate and a calculated average bit rate are compared to control the generated code amount (S2106). Bit rate control processing from S2103 to S2106 is repeated every predetermined period until the stop of recording is designated. As a result, the coding bit rate of moving image data converges to the target bit rate (S2107).

In L301, the change degree of the threshold of the target bit rate to the elapsed time is larger than that in L302. In code amount control, the generated code amount is controlled while the value of the quantization scale is slightly changed.

If the second mode is selected in S2101, the rate control setting circuit 126 controls the rate control circuit 127 so as to select L302 in FIG. 3 as the threshold of the average bit rate (S2108).

Then, maximum bit rate assurance processing (S2109) and VBV buffer assurance processing (S2110) are performed. The threshold of the average bit rate is set on the basis of L302 and the time elapsed after the start of recording (S2111). The set threshold of the average bit rate and the current average bit rate are compared to control the generated code amount (S2112). Bit rate control processing from S2109 to S2112 is repeated every predetermined period until the stop of recording is designated. Accordingly, the coding bit rate of moving image data converges to the target bit rate (S2113).

According to the ninth embodiment, the user can arbitrarily select a recording mode from the two modes having different times during which the coding bit rate converges to the target bit rate.

Even if, for example, photographing of a relatively short time is repeated and the recording time is wanted not to greatly vary, the second mode having a short convergence time is selected. When optimal code amount distribution is expected or it is expected to satisfy both the recording time and image quality, the first mode is selected, in which the coding bit rate converges to the target bit rate in a long period. In this way, the two modes can be properly used.

(10th Embodiment)

The 10th embodiment will be explained.

FIGS. 5 and 6 are timing charts showing the bit rate of encoded data generated as a result of coding bit rate control according to the 10th embodiment.

In the 10th embodiment, it is switched in accordance with a selected recording mode whether to control the code amount using coding complexity.

More specifically, in the first recording mode, the code amount is controlled so that the data rate of encoded moving image data converges to a target data rate regardless of the image state (coding complexity), which will be described later. In the second recording mode, when an image less changes at low coding complexity, the code amount is controlled so that the data rate converges to a predetermined target data rate. If the coding complexity becomes high, the set value of the target data rate is changed high to forcibly avoid convergence to a predetermined target data rate. Also in the 10th embodiment, the configuration of a recording apparatus is the same as that in FIG. 20, and a detailed description thereof will be omitted.

FIG. 5 is a timing chart showing a change of the coding bit rate per unit time when the target bit rate is set to a constant value BR regardless of the coding complexity of a moving image to be encoded. L501 represents a change of the coding bit rate per unit time, and L502 represents the coding complexity. If the coding complexity changes, the generated code amount temporarily changes, but the coding bit rate converges to the target bit rate BR upon the lapse of a predetermined convergence time.

In this case, the data rate of encoded moving image data can be set constant.

FIG. 6 is a timing chart showing a change of the coding bit rate per unit time when the coding complexity of a moving image to be encoded is high and the target bit rate is changed to BR (DPRD). DPRD is a predicted value for coding complexity D, and is estimated using the past generated code amount, image feature amount, and the like. L601 represents a change of the coding bit rate per unit time, and L602 represents the coding complexity.

If the coding complexity is equal to or lower than a predetermined level, the target bit rate is set to a constant value, similar to FIG. 5. If the coding complexity changes high, the target bit rate BR (DPRD) is changed in accordance with the changed coding complexity. Although the generated code amount (compression ratio) changes, the target bit rate can be so controlled as to reduce the difference in degradation of the image quality depending on the coding complexity.

In the 10th embodiment, when the first recording mode is selected, the code amount is controlled by a constant target bit rate, as shown in FIG. 5. When the second recording mode is selected, the code amount is controlled while the target bit rate is changed depending on the coding complexity, as shown in FIG. 6. A rate control setting circuit 126 switches and sets these two target bit rate control characteristics for a rate control circuit 127.

Figure 22:
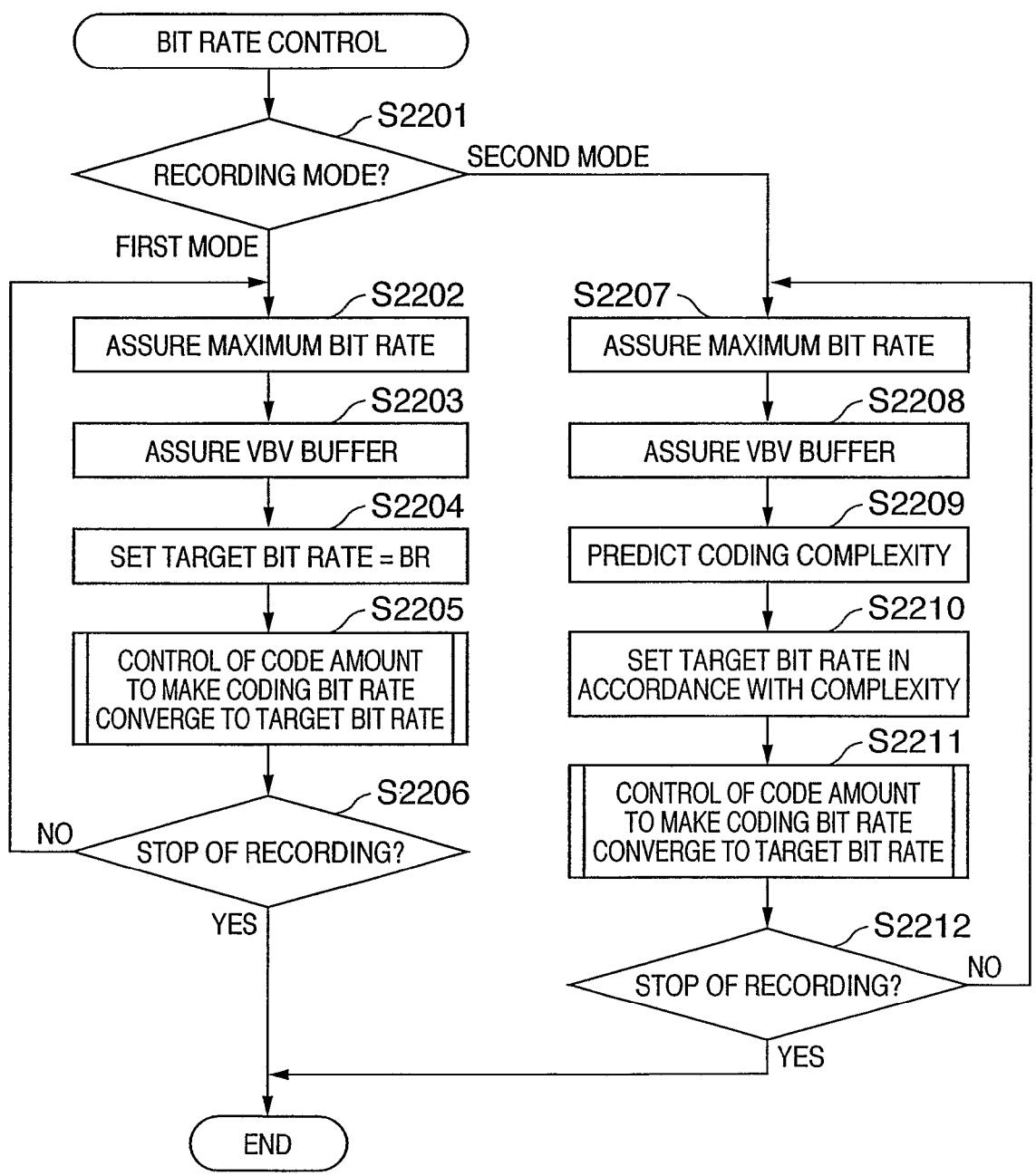
FIG. 22 is a flowchart showing the operation of bit rate control according to the 10th embodiment.

FIG. 22 is a flowchart showing bit rate control processing according to the 10th embodiment.

When the start of recording is designated with a switch (not shown), the flow starts to determine which of the modes is selected by a selection switch 132 (S2201). If the first mode is selected, the rate control setting circuit 126 executes maximum bit rate assurance processing (S2202) and VBV buffer assurance processing (S2203), similar to FIG. 21. The rate control circuit 127 sets the target bit rate to a predetermined value BR regardless of the coding complexity (S2204), and controls the generated code amount so that the coding bit rate converges to the target bit rate (S2205). Processing from S2202 to S2205 is executed every predetermined period until the stop of recording is designated (S2206).

If the second mode is selected, the rate control setting circuit 126 executes maximum bit rate assurance processing (S2207) and VBV buffer assurance processing (S2208), as shown in FIG. 21. The rate control circuit 127 obtains DPRD by predicting coding complexity from the past generated code amount, image feature amount, and the like (S2209). Based on this DPRD, the rate control circuit 127 obtains BR (DPRD) corresponding to the coding complexity, and sets it as a target bit rate (S2210). The rate control circuit 127 controls the generated code amount so that the coding bit rate converges to the target bit rate (S2211). Processing from S2207 to S2211 is executed every predetermined period until the stop of recording is designated (S2212).

According to the 10th embodiment, the recording mode can be arbitrarily switched in accordance with the photographing situation between the first mode in which the recording time can be assured by adjusting the coding bit rate to a constant target rate, and the second mode in which encoded moving image data can be recorded with almost constant degradation of the image quality even upon a change in coding complexity.

(11th Embodiment)

The 11th embodiment will be explained.

FIG. 8 is a timing chart showing the coding bit rate generated as a result of control according to the 11th Embodiment.

In the 11th embodiment, it is switched in accordance with a selected mode whether to control the generated code amount so that the average bit rate after the start of recording converges to a target value or to control the generated code amount so that the average bit rate in a predetermined period converges to a target value. Also in the 11th embodiment, the configuration of a recording apparatus is the same as that in FIG. 20, and a detailed description thereof will be omitted.

In FIG. 8, L801 represents an example of a change of the coding bit rate per unit time as a result of controlling the generated code amount, as described above, when the first mode is selected. In L801, the coding bit rate comes close to a target bit rate BR at time T2. An excess of the total generated code amount after the start of recording over the target bit rate is canceled, and the total generated code amount after the start of recording is adjusted close to the target bit rate BR x the period up to current time T1 after the start of recording. For this purpose, even after time T2, the generated code amount is suppressed, and the total average bit rate up to current time T1 after the start of recording is controlled to BR.

L802 represents an example of a change of the coding bit rate per unit time as a result of controlling the code amount, as described above, when the second mode is selected. In L802, the coding bit rate is controlled close to the target bit rate BR without suppressing the generated code amount any more after the coding bit rate converges to the target bit rate at time T2.

FIG. 9 is a timing chart showing the average bit rate calculation period set by a rate control circuit 127 in order to perform the above control, and the code amount generated during the period.

L901 represents the total generated code amount after the start of recording when coding is done by comparing, with the target bit rate BR, the total average bit rate during a period ST1 up to the current time after the start of recording. At time T2, the gradient of the generated code amount coincides with that of an increase in target code amount. However, the total generated code amount exceeds the target code amount, so the code amount is suppressed even after T2, as represented by L801.

L902 represents the code amount generated during a predetermined period ST2 when coding is done by comparing the average bit rate with the target bit rate every predetermined period ST2. In L902, after the average bit rate during the period ST2 reaches the target bit rate, the generated code amount is not reduced more than the target bit rate, unlike L801.

Figure 23:
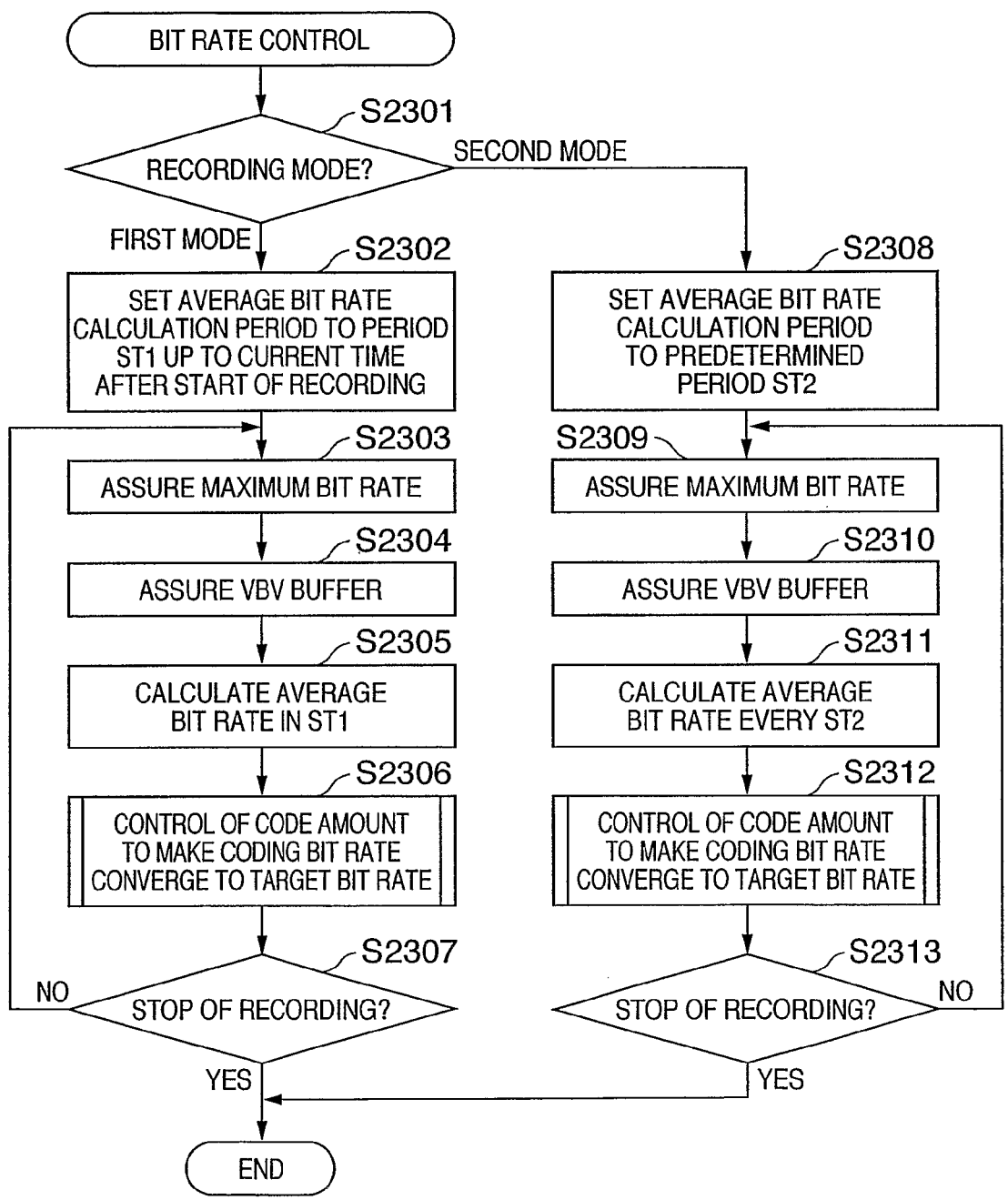
FIG. 23 is a flowchart showing the operation of bit rate control according to the 11th embodiment.

FIG. 23 is a flowchart showing bit rate control processing according to the 11th embodiment.

When the start of recording is designated with a switch (not shown), the flow starts to determine which of the modes is selected by a selection switch 132 (S2301). If the first mode is selected, a rate control setting circuit 126 sets the rate control circuit 127 so as to calculate an average bit rate during the period ST1 up to the current time after the start of recording (S2302).

Similar to FIG. 21, maximum bit rate assurance processing (S2303) and VBV buffer assurance processing (S2304) are executed. The rate control circuit 127 calculates an average bit rate during the period ST1 up to the current time after the start of recording (S2305), and controls the generated code amount so that the average bit rate converges to the target bit rate (S2306). Processing from S2303 to S2306 is executed every predetermined period until the stop of recording is designated (S2307).

If the second mode is selected in S2301, the rate control setting circuit 126 sets the rate control circuit 127 so as to calculate an average bit rate every predetermined period ST2 (S2308).

Similar to FIG. 21, maximum bit rate assurance processing (S2309) and VBV buffer assurance processing (S2310) are executed. The rate control circuit 127 calculates an average bit rate every set period ST2 (S2311), and controls the generated code amount so that the average bit rate converges to the target bit rate (S2312). Processing from S2309 to S2312 is executed every predetermined period until the stop of recording is designated (S2313).

According to the 11th embodiment, the recording mode can be arbitrarily selected in accordance with the photographing situation between the mode in which a high-quality moving image can be recorded without degrading the image quality after the bit rate converges to the target bit rate, and the mode in which coding assuring the recording time can be achieved.

(12th Embodiment)

The 12th embodiment will be explained.

In the 12th embodiment, it is switched in accordance with a selected mode whether to perform control of making the data rate of encoded data converge to a target bit rate. Also in the 12th embodiment, the schematic configuration view of a recording apparatus is FIG. 20, and a description thereof will be omitted.

FIG. 11 is a timing chart showing a change of the coding bit rate per unit time in the use of both target bit rate range assurance serving as short-period code amount control, and convergence control of making the average value of the generated code amount during a predetermined period converge to a target bit rate.

L1101 represents a change of the coding bit rate per unit time, and L1102 represents the coding complexity. If the coding complexity changes, the generated code amount temporarily changes, but the coding bit rate converges to a target bit rate BR upon the lapse of a predetermined convergence time.

In the 12th embodiment, an upper limit target BR+ and lower limit target BR− of the bit rate of encoded moving image data are set on the basis of the target bit rate BR. Bit rate range assurance processing is executed to perform short-period control so that the data rate of encoded moving image data falls within the target bit rate range of the upper limit target BR+ to the lower limit target BR−. Note that the upper limit target BR+ is set as an allowable range in accordance with the value of the target bit rate, and is different from a maximum bit rate set by the maximum recording rate and transmission rate of a medium that are assured in maximum bit rate assurance processing executed in the above embodiments.

FIG. 12 is a timing chart showing a change of the coding bit rate per unit time when only target bit rate range assurance processing serving as short-period code amount control is adopted, and convergence control of making the average value of the generated code amount during a predetermined period converge to a target bit rate is not executed.

L1201 represents a change of the coding bit rate per unit time, and L1202 represents the coding complexity. If the coding complexity changes, the generated code amount varies in the target bit rate range of BR+ to BR−, but convergence processing of the coding data rate to the target bit rate BR is not executed.

According to the 12th embodiment, a rate control setting circuit 126 switches and sets these two target bit rate control characteristics. More specifically, the rate control setting circuit 126 sets a rate control circuit 127 so as to execute control shown in FIG. 12 when a moving image input from the camera is selected, and control shown in FIG. 11 when an externally input image is selected. Accordingly, target bit rate control corresponding to an input signal can be implemented.

Figure 24:
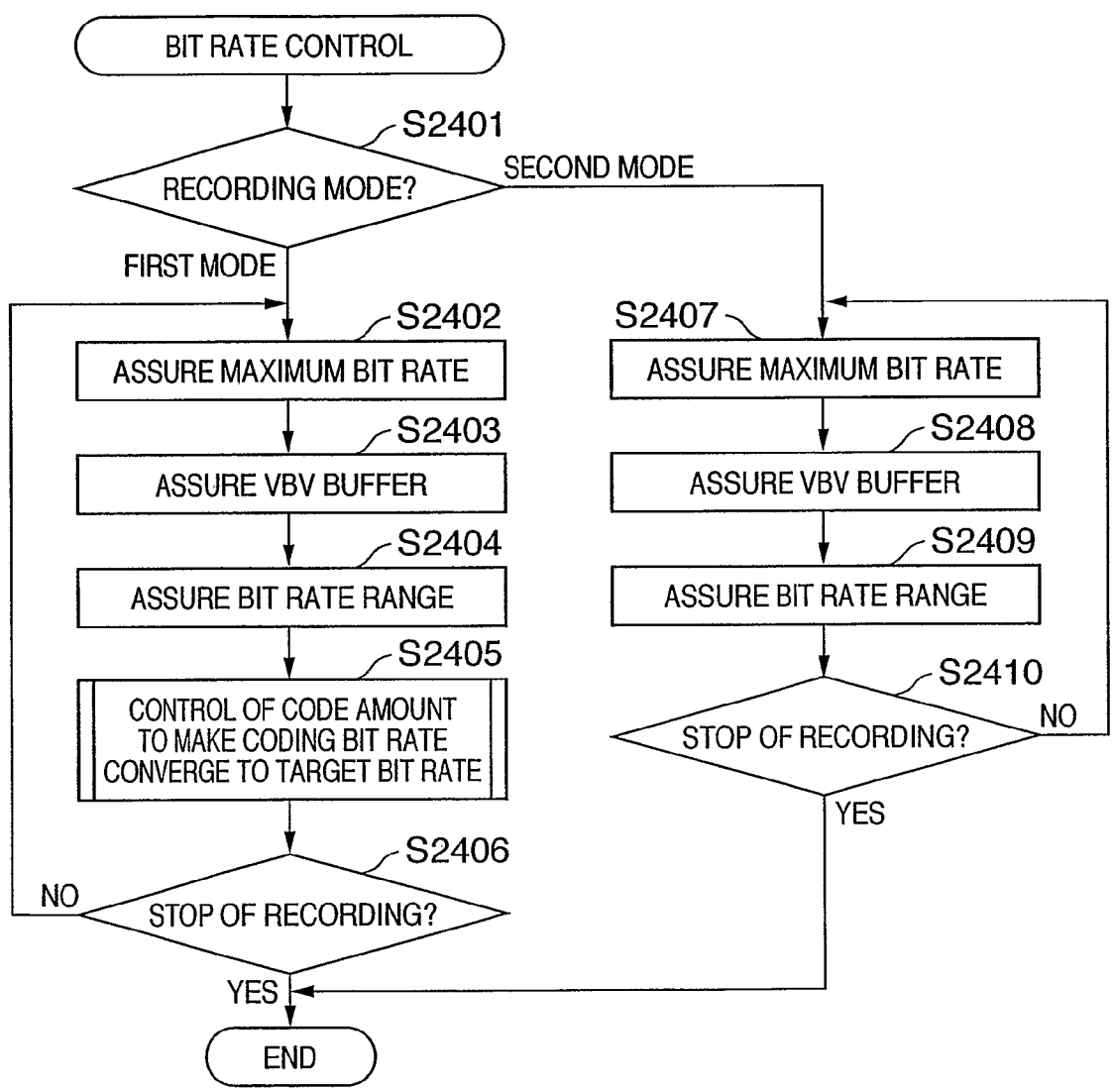
FIG. 24 is a flowchart showing the operation of bit rate control according to the 12th embodiment.

FIG. 24 is a flowchart showing bit rate control processing according to the 12th embodiment.

When the start of recording is designated with a switch (not shown), the flow starts to determine which of the modes is selected by a selection switch 132 (S2401). If the first mode is selected, the rate control setting circuit 126 sets, for the rate control circuit 127, a mode in which convergence processing to the target bit rate is done in addition to bit rate range assurance processing, as shown in FIG. 11.

Similar to FIG. 21, the rate control circuit 127 executes maximum bit rate assurance processing (S2402) and VBV buffer assurance processing (S2403). The rate control circuit 127 executes bit rate assurance processing to perform short-period code amount control for each picture, each GOP, or the like so that the data rate of encoded data falls within the allowable bit rate range of BR+ to BR− set for the target bit rate BR (S2404). The rate control circuit 127 executes code amount control processing so that the data rate of encoded moving image data converges to the target bit rate in a predetermined convergence time (S2405). Processing from S2402 to S2405 is executed every predetermined period until the stop of recording is designated (S2406).

If the second mode is selected in S2401, the rate control setting circuit 126 sets, for the rate control circuit 127, a mode in which only bit rate range assurance processing is done, as shown in FIG. 12.

Similar to FIG. 21, the rate control circuit 127 executes maximum bit rate assurance processing (S2407), VBV buffer assurance processing (S2408), and bit rate range assurance processing (S2409). Processing from S2407 to S2409 is executed every predetermined period until the stop of recording is designated (S2410).

According to the ninth to 12th embodiments, the bit rate is changed in the allowable range in accordance with the coding complexity without making the data rate of encoded data converge to the target bit rate itself. The user can select, in accordance with the photographing situation, one of the mode in which an image can be recorded with almost constant degradation of the image quality regardless of an image, and the mode in which recording that gives priority to the precision of the recording time, similar to a stay-at-home type recorder, can be achieved.

According to the ninth to 12th embodiments, the code amount control procedure can be arbitrarily selected when a moving image is encoded by variable bit rate coding and recorded. The user can arbitrarily switch between code amount control processing which gives priority to the recording image quality and code amount control processing which gives priority to the recording time or the like.

(13th Embodiment)

Figure 25:
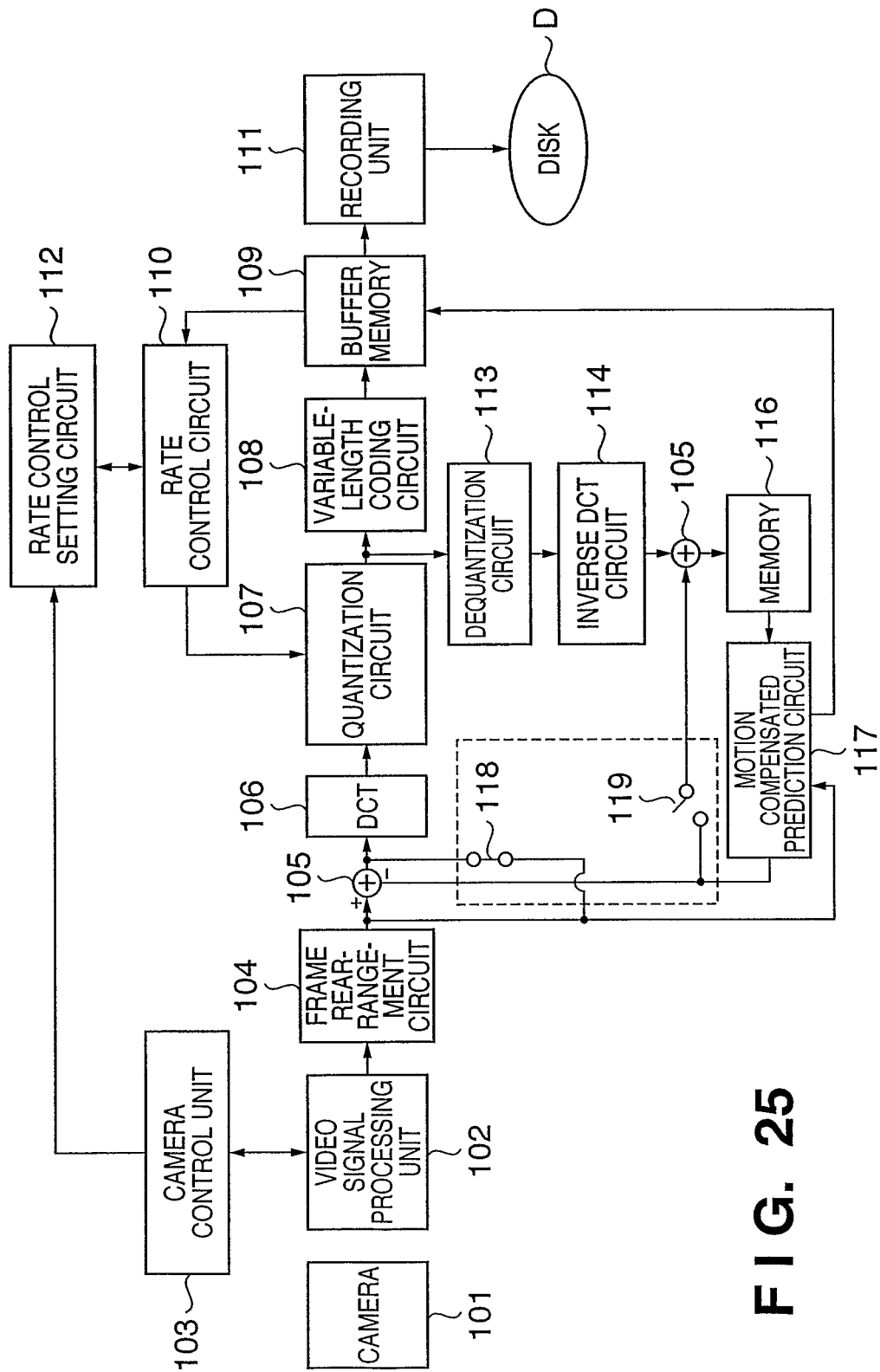
FIG. 25 is a block diagram showing the schematic configuration of a video camera according to the 13th to 16th embodiments to which the present invention is applied.

FIG. 25 is a block diagram showing a schematic configuration according to the 13th embodiment of the present invention.

In FIG. 25, reference numeral 101 denotes a camera which is made up of a lens optical system and an image capturing element such as a CCD. An analog moving image signal obtained upon image capturing by the camera 101 is converted into a digital image signal by a camera signal processing unit 102. The image signal undergoes processes such as pixel interpolation, color conversion, and Γ conversion, and is supplied to a frame rearrangement circuit 104 as data of an image format that is to be encoded.

A camera control circuit 103 controls the amplification gain of the video signal processing unit 102 in accordance with the brightness of an image signal output from the camera 101. For example, when an image signal has a low brightness and the shutter speed is lower than a predetermined value, the amplification gain of the signal processing unit 102 is increased to prevent a decrease in shutter speed under the control of the camera control circuit, in order to prevent any afterimage.

Input moving image signals are rearranged in the coding order by the frame rearrangement circuit 104. For example, in MPEG-2 coding, a bidirectionally predictive frame called a B picture should be encoded after preceding and succeeding frames are encoded. The frame rearrangement circuit 104 rearranges the frames of input moving image data in the coding order, and then outputs the data.

In encoding an I picture, a difference circuit 105 directly outputs image data from the rearrangement circuit 104 in accordance with selection by a switch 118. In encoding P and B pictures, the difference circuit 105 obtains a difference value from predicted image data output from a motion compensated prediction circuit 117, and outputs the difference value. A DCT circuit 106 executes known DCT processing for image data output from the difference circuit 105, and outputs a DCT coefficient. The image data transformed into the DCT coefficient by the DCT circuit 106 is quantized by a quantization circuit 107 at a predetermined quantization scale Q. By changing the value Q, the coefficient value after quantization greatly changes to change a generated code amount after variable-length coding.

A variable-length coding circuit 108 entropy-encodes the quantization coefficient, and outputs it as encoded data. A buffer memory 109 temporarily saves encoded data for coding rate control. Encoded data stored in the buffer is read out at a predetermined rate, undergoes packetization, multiplexing, recording modulation, and the like by a recording unit 111, and then is recorded on a disk D. In the 13th embodiment, the disk D is an optical disk.

In order to obtain predicted image data, coefficient data quantized by the quantization circuit 107 is dequantized by a dequantization circuit 113, and undergoes inverse DCT transform by an inverse DCT circuit 114.

In encoding an I picture, an addition circuit 115 directly outputs data having undergone inverse DCT transform in accordance with selection by a switch 119. In encoding a P or B picture, the addition circuit 115 adds transformed data and predicted image data output from the motion compensated prediction circuit 117, and saves the resultant data as locally decoded image data in a memory 116.

The motion compensated prediction circuit 117 compares the locally decoded image accumulated in the memory 116 with an input image, and generates predicted image data having undergone motion compensation. The motion compensated prediction circuit 117 supplies the predicted image data to the difference circuit 105, and also supplies the data as a predicted image for the next local decoding to the addition circuit 115.

A rate control setting circuit 112 changes the coding rate control parameter of a rate control circuit 110 on the basis of the gain control state of the video signal processing unit 102 by the camera control circuit 103. Details of a change of the control parameter will be described later.

The rate control circuit 110 controls a quantization scale value Q by using information such as the generated code amount and buffer occupancy obtained from the buffer memory 109. More specifically, the rate control setting circuit 110 sets a control parameter in accordance with each recording mode, and makes the data rate of encoded moving image data converge to a target bit rate.

FIG. 2 is a timing chart showing the coding bit rate of moving image data generated upon switching of coding bit rate control according to the 13th embodiment.

In the 13th embodiment, the convergence time until the coding bit rate converges to a target bit rate is switched in accordance with the gain setting state of the video signal processing unit 102 by the camera control unit 103. L201 represents a change of the coding bit rate per unit time when the gain is equal to or smaller than a predetermined threshold. In L201, the coding bit rate converges to a target bit rate BR in a convergence time T1.

L202 represents a change of the coding bit rate per unit time when the gain exceeds the threshold. In L202, the coding bit rate converges to the target bit rate in a convergence time T2 much shorter than T1.

FIG. 3 is a timing chart showing the threshold of the average bit rate set by the rate control circuit 110 in order to perform the above-described control. L301 represents the threshold of the average bit rate in a predetermined period when the convergence time is T1. If the current average bit rate is higher than L301 with respect to the elapsed time, the generated code amount is too large for the target bit rate.

Thus, the quantization scale is controlled large to make the average bit rate converge to the target bit rate.

L302 represents the threshold of the average bit rate in a predetermined period when the convergence time is T2. The same control as that for L301 is executed to make the average bit rate converge to the target bit rate in the convergence time T2. In the 13th embodiment, the rate control setting circuit 112 sets the target bit rate control operation in the rate control circuit 110 in accordance with the gain setting state by the camera control unit 103.

More specifically, the rate control setting circuit 112 sets the rate control circuit 110 so as to select L301 in FIG. 3 when the gain is equal to or smaller than a threshold TH, and L302 when the gain exceeds the threshold. The convergence time until the coding bit rate reaches a target bit rate can be optimally controlled in accordance with the state of a photographed image.

FIG. 26 is a flowchart showing bit rate control processing according to the 13th embodiment.

When the start of recording is designated with a switch (not shown), the flow starts to determine whether the set value of the gain by the camera control unit 103 exceeds a threshold (S2601). If the gain is equal to or smaller than the threshold, the rate control setting circuit 112 controls the rate control circuit 110 so as to select L301 in FIG. 3 as the threshold of the average bit rate (S2602).

Then, maximum bit rate assurance processing (S2603) and VBV buffer assurance processing (S2604) are performed. In maximum bit rate assurance processing, in addition to the target bit rate, the current quantization scale is controlled not to exceed the upper limit of recording such as the maximum transfer rate of the disk D. In VBV buffer assurance processing, the current quantization scale is controlled to prevent overflow and underflow of a virtual buffer called VBV in MPEG-2. Note that no overflow occurs in principle in variable bit rate coding. The coding control processes in S2603 and S2604 are general ones, examples of them are described in Japanese Patent Laid-Open No. 2000-197048, and a detailed description thereof will be omitted.

The threshold of the average bit rate is set on the basis of L301 and the time elapsed after the start of recording (S2605). The set threshold of the average bit rate and a calculated average bit rate are compared to control the generated code amount (S2606). Bit rate control processing from S2603 to S2606 is repeated every predetermined period until the stop of recording is designated. As a result, the coding bit rate of moving image data converges to the target bit rate (S2607).

In L301, the change degree of the threshold of the target bit rate to the elapsed time is smaller than that in L302. In code amount control, the generated code amount is controlled while the value of the quantization scale is slightly changed.

If the gain value exceeds the threshold in S2601, the rate control setting circuit 112 controls the rate control circuit 110 so as to select L302 in FIG. 3 as the threshold of the average bit rate (S2608).

Then, maximum bit rate assurance processing (S2609) and VBV buffer assurance processing (S2610) are performed. The threshold of the average bit rate is set on the basis of L302 and the time elapsed after the start of recording (S2611). The set threshold of the average bit rate and the current average bit rate are compared to control the generated code amount (S2612). Bit rate control processing from S2609 to S2612 is repeated every predetermined period until the stop of recording is designated. Accordingly, the coding bit rate of moving image data converges to the target bit rate (S2613).

According to the 13th embodiment, the bit rate control operation is switched in accordance with the gain setting state by the camera control unit.

If a photographed image becomes excessively dark and the gain increases, the coding bit rate is controlled to converge to a target bit rate in a short time. Even in a situation in which the coding complexity becomes high, a great change in recording time can be prevented by suppressing variations in generated code amount.

When an image has normal brightness, optimal code amount distribution can be implemented by setting a long convergence time.

(14th Embodiment)

The 14th embodiment will be explained.

FIGS. 5 and 6 are timing charts showing the bit rate of encoded data generated as a result of coding bit rate control according to the 14th embodiment.

In the 14th embodiment, whether to control the code amount using coding complexity is switched in accordance with the gain setting state by a camera control unit 103.

More specifically, when the gain value is equal to or smaller than a threshold, the code amount is controlled so that the data rate of encoded moving image data converges to a target data rate regardless of the image state (coding complexity), which will be described later. To the contrary, when the gain exceeds the threshold and an image less changes at low coding complexity, the code amount is controlled so that the data rate converges to a predetermined target data rate. If the coding complexity becomes high, the set value of the target data rate is changed high to forcibly avoid convergence to a predetermined target data rate. Also in the 14th embodiment, the configuration of a recording apparatus is the same as that in FIG. 25, and a detailed description thereof will be omitted.

FIG. 5 is a timing chart showing a change of the coding bit rate per unit time when the target bit rate is set to a constant value BR regardless of the coding complexity of a moving image to be encoded. L501 represents a change of the coding bit rate per unit time, and L502 represents the coding complexity. If the coding complexity changes, the generated code amount temporarily changes, but the coding bit rate converges to the target bit rate BR upon the lapse of a predetermined convergence time.

In this case, the data rate of encoded moving image data can be set constant.

FIG. 6 is a timing chart showing a change of the coding bit rate per unit time when the coding complexity of a moving image to be encoded is high and the target bit rate is changed to BR (DPRD). DPRD is a predicted value for coding complexity D, and is estimated using the past generated code amount, image feature amount, and the like. L601 represents a change of the coding bit rate per unit time, and L602 represents the coding complexity.

If the coding complexity is equal to or lower than a predetermined level, the target bit rate is set to a constant value, similar to FIG. 5. If the coding complexity changes high, the target bit rate BR (DPRD) is changed in accordance with the changed coding complexity. Although the generated code amount (compression ratio) changes, the target bit rate can be so controlled as to reduce the difference in degradation of the image quality depending on the coding complexity.

Figure 27:
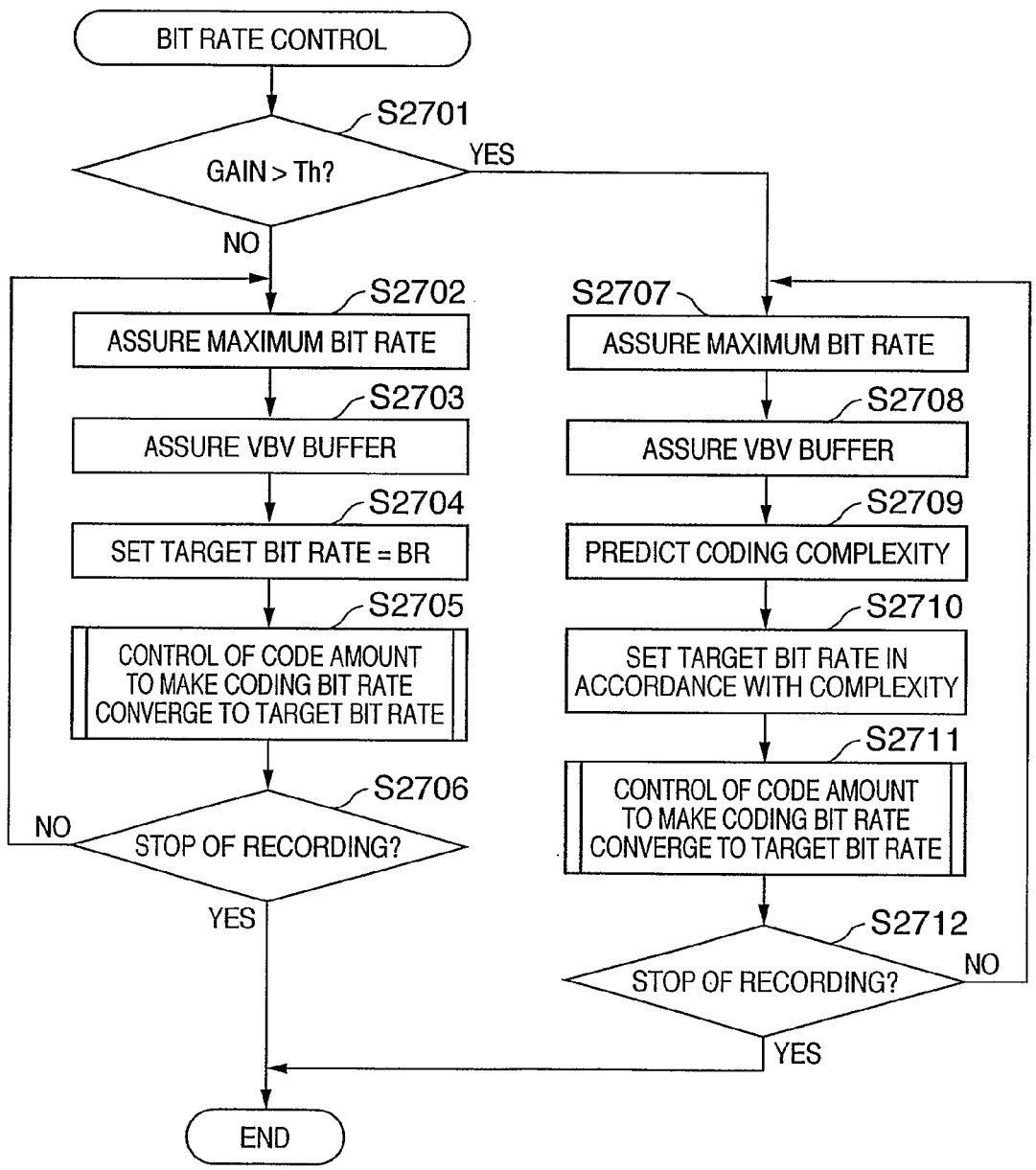
FIG. 27 is a flowchart showing the operation of bit rate control according to the 14th embodiment.

FIG. 27 is a flowchart showing bit rate control processing according to the 14th embodiment.

When the start of recording is designated with a switch (not shown), the flow starts to determine whether the set value of the gain by the camera control unit 103 exceeds a threshold (S2701). If the gain is equal to or smaller than the threshold, a rate control setting circuit 112 executes maximum bit rate assurance processing (S2702) and VBV buffer assurance processing (S2703), similar to FIG. 26. A rate control circuit 110 sets the target bit rate to a predetermined value BR regardless of the coding complexity (S2704), and controls the generated code amount so that the coding bit rate converges to the target bit rate (S2705). Processing from S2702 to S2705 is executed every predetermined period until the stop of recording is designated (S2706).

If the gain exceeds the threshold, the rate control setting circuit 112 executes maximum bit rate assurance processing (S2707) and VBV buffer assurance processing (S2708), similar to FIG. 26. The rate control circuit 110 obtains DPRD by predicting coding complexity from the past generated code amount, image feature amount, and the like (S2709). Based on this DPRD, the rate control circuit 110 obtains BR (DPRD) corresponding to the coding complexity, and sets it as a target bit rate (S2710). The rate control circuit 110 controls the generated code amount so that the coding bit rate converges to the target bit rate (S2711). Processing from S2707 to S2711 is executed every predetermined period until the stop of recording is designated (S2712).

According to the 14th embodiment, when the gain exceeds the threshold and the coding complexity becomes high, degradation of the image quality can be controlled almost constant using a target bit rate corresponding to the coding complexity regardless of an image. When the gain is equal to or smaller than the threshold, code amount control which gives priority to the precision of the recording time can be implemented.

(15th Embodiment)

The 15th embodiment will be explained.

FIG. 8 is a timing chart showing the coding bit rate generated as a result of control according to the 15th Embodiment.

In the 15th embodiment, it is switched in accordance with the gain setting state by a camera control unit 103 at the start of photographing whether to control the generated code amount so that the average bit rate after the start of recording converges to a target value or to control the generated code amount so that the average bit rate in a predetermined period converges to a target value. Also in the 15th embodiment, the configuration of a recording apparatus is the same as that in FIG. 25, and a detailed description thereof will be omitted.

In FIG. 8, L801 represents an example of a change of the coding bit rate per unit time as a result of controlling the generated code amount, as described above, when the gain is equal to or smaller than a threshold. In L801, the coding bit rate comes close to a target bit rate BR at time T2. An excess of the total generated code amount after the start of recording over the target bit rate is canceled, and the total generated code amount after the start of recording is adjusted close to the target bit rate BR x the period up to current time T1 after the start of recording. For this purpose, even after time T2, the generated code amount is suppressed, and the total average bit rate up to current time T1 after the start of recording is controlled to BR.

L802 represents an example of a change of the coding bit rate per unit time as a result of controlling the code amount, as described above, when the gain exceeds the threshold. In L802, the coding bit rate is controlled close to the target bit rate BR without suppressing the generated code amount any more after the coding bit rate converges to the target bit rate at time T2.

FIG. 9 is a timing chart showing the average bit rate calculation period set by a rate control circuit 110 in order to perform the above control, and the code amount generated during the period.

L901 represents the total generated code amount after the start of recording when coding is done by comparing, with the target bit rate BR, the total average bit rate during a period ST1 up to the current time after the start of recording. At time T2, the gradient of the generated code amount coincides with that of an increase in target code amount. However, the total generated code amount exceeds the target code amount, so the code amount is suppressed even after T2, as represented by L801.

L902 represents the code amount generated during a predetermined period ST2 when coding is done by comparing the average bit rate with the target bit rate every predetermined period ST2. In L902, after the average bit rate during the period ST2 reaches the target bit rate, the generated code amount is not reduced more than the target bit rate, unlike L801.

Figure 28:
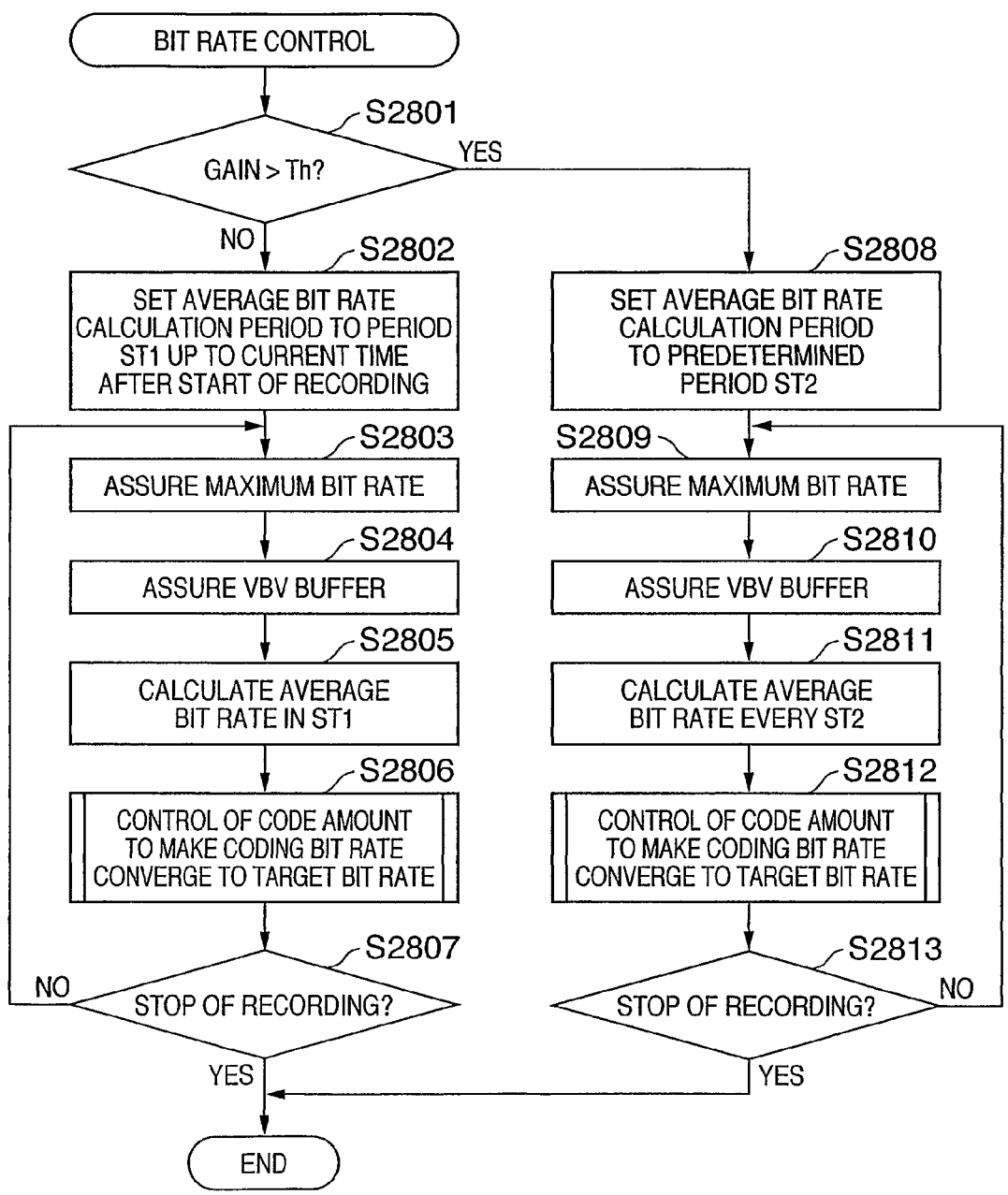
FIG. 28 is a flowchart showing the operation of bit rate control according to the 15th embodiment.

FIG. 28 is a flowchart showing bit rate control processing according to the 15th embodiment.

When the start of recording is designated with a switch (not shown), the flow starts to determine whether the set value of the gain by a camera control unit 103 exceeds a threshold (S2801). If the gain is equal to or smaller than the threshold, a rate control setting circuit 112 sets the rate control circuit 110 so as to calculate an average bit rate during the period ST1 up to the current time after the start of recording, and control the code amount (S2802).

Similar to FIG. 26, maximum bit rate assurance processing (S2803) and VBV buffer assurance processing (S2804) are executed. The rate control circuit 110 calculates an average bit rate during the period ST1 up to the current time after the start of recording (S2805), and controls the generated code amount so that the average bit rate converges to the target bit rate (S2806). Processing from S2803 to S2806 is executed every predetermined period until the stop of recording is designated (S2807).

If the gain exceeds the threshold in S2801, the rate control setting circuit 112 sets the rate control circuit 110 so as to calculate an average bit rate every predetermined period ST2 (S2808).

Similar to FIG. 26, maximum bit rate assurance processing (S2809) and VBV buffer assurance processing (S2810) are executed. The rate control circuit 110 calculates an average bit rate every set period ST2 (S2811), and controls the generated code amount so that the average bit rate converges to the target bit rate (S2812). Processing from S2809 to S2812 is executed every predetermined period until the stop of recording is designated (S2813).

According to the 15th embodiment, when an image of normal brightness is photographed, a high-quality moving image can be recorded without degrading the image quality after the bit rate converges to the target bit rate. When an image whose gain exceeds the threshold is photographed, variations in code amount by an increase in coding complexity can be suppressed to implement coding which assures the recording time.

(16th Embodiment)

The 16th embodiment will be explained.

In the 16th embodiment, whether to perform control of making the data rate of encoded data converge to a target bit rate is switched in accordance with the gain setting state by a camera control unit 103. Also in the 16th embodiment, the schematic configuration view of a recording apparatus is FIG. 25, and a description thereof will be omitted.

FIG. 11 is a timing chart showing a change of the coding bit rate per unit time in the use of both target bit rate range assurance serving as short-period code amount control, and convergence control of making the average value of the generated code amount during a predetermined period converge to a target bit rate.

L1101 represents a change of the coding bit rate per unit time, and L1102 represents the coding complexity. If the coding complexity changes, the generated code amount temporarily changes, but the coding bit rate converges to a target bit rate BR upon the lapse of a predetermined convergence time.

In the 16th embodiment, an upper limit target BR+ and lower limit target BR− of the bit rate of encoded moving image data are set on the basis of the target bit rate BR. Bit rate range assurance processing is executed to perform short-period control so that the data rate of encoded moving image data falls within the target bit rate range of the upper limit target BR+ to the lower limit target BR−. Note that the upper limit target BR+ is set as an allowable range in accordance with the value of the target bit rate, and is different from a maximum bit rate set by the maximum recording rate and transmission rate of a medium that are assured in maximum bit rate assurance processing executed in the above embodiments.

FIG. 12 is a timing chart showing a change of the coding bit rate per unit time when only target bit rate range assurance processing serving as short-period code amount control is adopted, and convergence control of making the average value of the generated code amount during a predetermined period converge to a target bit rate is not executed.

L1201 represents a change of the coding bit rate per unit time, and L1202 represents the coding complexity. If the coding complexity changes, the generated code amount varies in the target bit rate range of BR+ to BR−, but convergence processing of the coding data rate to the target bit rate BR is not executed.

In the 16th embodiment, a rate control setting circuit 112 switches and sets these two target bit rate control characteristics. More specifically, the rate control setting circuit 112 sets a rate control circuit 110 so as to execute control shown in FIG. 12 when the gain set by the camera control unit 103 exceeds a threshold, and control shown in FIG. 11 when the gain is equal to or smaller than the threshold. Hence, target bit rate control corresponding to an input signal can be achieved.

FIG. 29 is a flowchart showing bit rate control processing according to the 16th embodiment.

When the start of recording is designated with a switch (not shown), the flow starts to determine whether the set value of the gain by the camera control unit 103 exceeds a threshold (S2901). If the gain is equal to or smaller than the threshold, the rate control setting circuit 112 sets, for the rate control circuit 110, a mode in which convergence processing to the target bit rate is done in addition to bit rate range assurance processing, as shown in FIG. 11.

Similar to FIG. 26, the rate control circuit 110 executes maximum bit rate assurance processing (S2902) and VBV buffer assurance processing (S2903). The rate control circuit 110 executes bit rate assurance processing to perform short-period code amount control for each picture, each GOP, or the like so that the data rate of encoded data falls within the allowable bit rate range of BR+ to BR− set for the target bit rate BR (S2904). The rate control circuit 110 executes code amount control processing so that the data rate of encoded moving image data converges to the target bit rate in a predetermined convergence time (S2905). Processing from S2902 to S2905 is executed every predetermined period until the stop of recording is designated (S2906).

If the gain exceeds the threshold in S2901, the quantization circuit 112 sets, for the difference circuit 110, a mode in which only bit rate range assurance processing is done, as shown in FIG. 12.

Similar to FIG. 26, the rate control circuit 110 executes maximum bit rate assurance processing (S2907), VBV buffer assurance processing (S2908), and bit rate range assurance processing (S2909). Processing from S2907 to S2909 is executed every predetermined period until the stop of recording is designated (S2910).

According to the 16th embodiment, when the gain exceeds the threshold, the data rate of encoded data is changed within the allowable range in accordance with the coding complexity without making the data rate converge to the target bit rate itself. An image can be recorded with almost constant degradation of the image quality regardless of an image. When the gain is equal to or smaller than the threshold, recording which gives priority to the precision of the recording time can be achieved.

According to the 13th to 16th embodiments, bit rate control is changed in accordance with the gain setting state by the camera control unit. Alternatively, bit rate control may be changed on the basis of luminance information of the photographing frame and the gain setting state.

According to the 13th to 16th embodiments, even if the gain of the image processing circuit increases and the coding complexity becomes high, a great change in recording time can be prevented by suppressing variations in generated code amount.

The present invention is not limited to the above embodiments and various changes and modifications can be made within the spirit and scope of the present invention. Therefore, to apprise the public of the scope of the present invention the following claims are made.

This application claims the benefit of Japanese Patent Application No. 2005-047442 filed on Feb. 23, 2005, Japanese Patent Application No. 2005-047443 filed on Feb. 23, 2005, Japanese Patent Application No. 2005-047444 filed on Feb. 23, 2005 and Japanese Patent Application No. 2005-294998 filed on Oct. 7, 2005, which is hereby incorporated by reference herein in its entirety.

The invention claimed is:

1. An image processing apparatus comprising:
a first input unit that inputs first moving image data;
a second input unit that inputs second moving image data;
a selection unit that selects one of the first moving image data and the second moving image data;
a coding unit that encodes one of the first moving image data and the second moving image data which is selected by said selection unit by a variable bit rate coding method of changing assignment of a code amount in accordance with a state of the moving image data to be encoded;
a recording unit that records encoded moving image data output from said coding unit on a recording medium;
a setting unit that changes a target time after start of recording the moving image data until a data rate of the encoded moving image data is converged to a predetermined target data rate in accordance with a selection result of one of the first moving image data and the second moving image data by the selection unit such that a first predetermined time is set as the target time if the first moving image data is selected by the selection unit and a second predetermined time longer than the first predetermined time is set as the target time if the second moving image data is selected by the selection unit; and
a code amount control unit that controls a code amount of the encoded moving image data output from said coding unit in accordance with the target time set by the setting unit such that the data rate of the encoded moving image data is converged to the predetermined target data rate in the first predetermined time from the start of recording the moving image data if the first predetermined time is set as the target time by the setting unit and the data rate of the encoded moving image data is converged to the predetermined target data rate in the second predetermined time from the start of recording the moving image data if the second predetermined time is set as the target time by the setting unit.

2. The apparatus according to claim 1, wherein the code amount control unit controls a data rate of the encoded moving image data based on a comparing result obtained by comparing the data rate of the encoded moving image data with a predetermined comparison value, and changes the comparison value from a predetermined value to a value corresponding to the predetermined target data rate in accordance with a recording start instruction, and
wherein the code amount control unit determines a period during which the comparison value is changed to the value corresponding to the predetermined target data rate in accordance with the set target time.

3. An image processing apparatus comprising:
a first input unit that inputs first moving image data;
a second input unit that inputs second moving image data;
a selection unit that selects one of the first moving image data and the second moving image data;
a coding unit that encodes one of the first moving image data and the second moving image data which is selected by said selection unit;
a recording unit that records encoded moving image data output from said coding unit on a recording medium;
a setting unit that changes a calculation period of a data rate of the encoded moving image data in accordance with a selection result of one of the first moving image data and second moving image data by the selection unit such that a first predetermined period is set as the calculation period if the first moving image data is selected by the selection unit and a second predetermined period shorter than the first predetermined period is set as the calculation period if the second moving image data is selected by the selection unit; and
a code amount control unit that controls a code amount of the encoded moving image data output from said coding unit in accordance with the calculation period set by the setting unit so that the data rate of the encoded moving image data calculated in the first predetermined period becomes to a target data rate if the first calculation period is set as the calculation period by the setting unit and the data rate of the encoded moving image data calculated in the second predetermined period becomes to a target data rate if the second calculation period is set as the calculation period by the setting unit.

4. The apparatus according to claim 3, wherein said setting unit changes a duration of the calculation period of the data rate of the encoded moving image data in accordance with the selection result of one of the first moving image data and second moving image data by the selection unit.

5. The apparatus according to claim 3, wherein the first predetermined period is a total period after start of recording is designated.

6. The apparatus according to any one of claims 3, wherein said first input unit includes an image capturing unit, and said second input unit inputs the second moving image data from outside the apparatus.

7. An image processing apparatus comprising:
an input unit that inputs moving image data;
a coding unit that encodes the moving image data input by said input unit by a variable bit rate coding method of changing assignment of a code amount in accordance with a state of the moving image data to be encoded;
a first recording unit that records encoded moving image data output from said coding unit on a first recording medium;
a second recording unit that records the encoded moving image data output from said coding unit on a second recording medium;
a selection unit that selects one of the first recording medium and the second recording medium such that the first recording unit records the encoded moving image data on the first recording medium if the first recording medium is selected and the second recording unit records the encoded moving image data on the second recording medium if the second recording medium is selected;
a setting unit that changes a target time after start of recording the moving image data until a data rate of the encoded moving image data is converged to a predetermined target data rate in accordance with a selection result of one of the first recording medium and the second recording medium by the selection unit such that a first predetermined time is set as the target time if the first recording medium is selected by the selection unit and a second predetermined time longer than the first predetermined time is set as the target time if the second recording medium is selected by the selection unit; and
a code amount control unit that controls a code amount of the encoded moving image data output from said coding unit in accordance with the target time set by the setting unit such that the data rate of the encoded moving image data is converged to the predetermined target data rate in the first predetermined time from the start of recording the moving image data if the first predetermined time is set as the target time by the setting unit and the data rate of the encoded moving image data is converged to the predetermined target data rate in the second predetermined time from the start of recording the moving image data if the second predetermined time is set as the target time by the setting unit.

8. The apparatus according to claim 7, wherein the code amount control unit controls a data rate of the encoded moving image data based on a comparing result obtained by comparing the data rate of the encoded moving image data with a predetermined comparison value, and changes the comparison value from a predetermined value to a value corresponding to the predetermined target data rate in accordance with a recording start instruction, and
wherein the code amount control unit determines a period during which the comparison value is changed to the value corresponding to the predetermined target data rate in accordance with the set target time.

9. An image processing apparatus comprising:
an input unit that inputs moving image data;
a coding unit that encodes the moving image data input by said input unit by a variable bit rate coding method of changing assignment of a code amount in accordance with a state of the moving image data to be encoded;
a first recording unit that records encoded moving image data output from said coding unit on a first recording medium;
a second recording unit that records the encoded moving image data output from said coding unit on a second recording medium;
a selection unit that selects one of the first recording medium and the second recording medium such that the first recording unit records the encoded moving image data on the first recording medium if the first recording medium is selected and the second recording unit records the encoded moving image data on the second recording medium if the second recording medium is selected;
a setting unit that changes a calculation period a data rate of the encoded moving image data in accordance with a selection result of one of the first recording medium and the second recording medium by the selection unit such that a first predetermined period is set as the calculation period if the first recording medium is selected by the selection unit and a second predetermined period shorter than the first predetermined period is set as the calculation period if the second recording medium is selected by the selection unit; and
a code amount control unit that controls a code amount of the encoded moving image data output from said coding unit in accordance with the calculation period set by the setting unit so that the data rate of the encoded moving image data calculated in the first predetermined period becomes to a target data rate if the first calculation period is set as the calculation period by the setting unit and the data rate of the encoded moving image data calculated in the second predetermined period becomes to a target data rate if the second calculation period is set as the calculation period by the setting unit.

10. The apparatus according to claim 9, wherein said setting unit changes a duration of the calculation period of the data rate of the encoded moving image data in accordance with the selection result of one of the first recording medium and the second recording medium which is selected by the selection unit by the selection unit.

11. The apparatus according to claim 9, wherein said the first predetermined period is a total period after start of recording is designated.

12. The apparatus according to any one of claims 9, wherein a recordable data amount of the first recording medium and a recordable data amount of the second recording medium are different from each other.

* * * * *